US 9,234,110 B2

(12) United States Patent
Katoh et al.

(10) Patent No.: US 9,234,110 B2
(45) Date of Patent: Jan. 12, 2016

(54) INK FOR INKJET RECORDING, AND INK CARTRIDGE, INKJET RECORDING METHOD, INKJET RECORDER, INK-RECORDED MATTER AND METHOD OF PRODUCING THE INK-RECORDED MATTER USING THE INK

(71) Applicants: Keita Katoh, Shizuoka (JP); Mitsuru Naruse, Shizuoka (JP); Akihiko Matsuyama, Shizuoka (JP); Masayasu Nonogaki, Shizuoka (JP); Minoru Hakiri, Shizuoka (JP); Kazukiyo Nagai, Shizuoka (JP); Yuusuke Koizuka, Shizuoka (JP)

(72) Inventors: Keita Katoh, Shizuoka (JP); Mitsuru Naruse, Shizuoka (JP); Akihiko Matsuyama, Shizuoka (JP); Masayasu Nonogaki, Shizuoka (JP); Minoru Hakiri, Shizuoka (JP); Kazukiyo Nagai, Shizuoka (JP); Yuusuke Koizuka, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/595,531

(22) Filed: Jan. 13, 2015

(65) Prior Publication Data
US 2015/0125672 A1 May 7, 2015

Related U.S. Application Data

(62) Division of application No. 14/096,320, filed on Dec. 4, 2013, now Pat. No. 8,960,885.

(30) Foreign Application Priority Data

Jan. 17, 2013 (JP) .................................. 2013-005951

(51) Int. Cl.
*B41J 2/01* (2006.01)
*C09D 11/36* (2014.01)
(Continued)

(52) U.S. Cl.
CPC ............... *C09D 11/36* (2013.01); *B41J 2/2107* (2013.01); *C09D 11/106* (2013.01); *C09D 11/30* (2013.01); *C09D 11/322* (2013.01); *C09D 11/326* (2013.01); *B41J 2/01* (2013.01); *Y10T 428/24901* (2015.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ............ 106/31.6, 31.27, 31.13; 347/100, 95, 347/96, 88, 99, 20, 21, 102.13, 31.27
See application file for complete search history.

(56) References Cited

U.S. PATENT DOCUMENTS

| | | | |
|---|---|---|---|
| 2003/0081092 A1* | 5/2003 | Ishizuka et al. | ............... 347/100 |
| 2004/0087444 A1 | 5/2004 | Naruse et al. | |

(Continued)

FOREIGN PATENT DOCUMENTS

| | | |
|---|---|---|
| JP | 2003-147243 | 5/2003 |
| JP | 2004-277519 | 10/2004 |

(Continued)

*Primary Examiner* — Manish S Shah
(74) *Attorney, Agent, or Firm* — Cooper & Dunham LLP

(57) ABSTRACT

An ink for inkjet recording, which is used for recording on a paper having a concentration of an eluted Ca ion of from $1.0\times10^{-4}$ to $5.0\times10^{-4}$ g/g when dipped in pure water. The ink includes at least a pigment, a pigment dispersant, a water-soluble organic solvent and water. The pigment dispersant is a copolymer synthesized using at least (1) unsaturated ethylene monomer having a phosphoric acid group or a phosphonic acid group and (2) unsaturated ethylene monomer having an alkyl group having 12 to 22 carbon atoms.

14 Claims, 9 Drawing Sheets

(51) Int. Cl.
*C09D 11/30* (2014.01)
*B41J 2/21* (2006.01)
*C09D 11/322* (2014.01)
*C09D 11/106* (2014.01)
*C09D 11/326* (2014.01)

(56) References Cited

U.S. PATENT DOCUMENTS

2011/0211014 A1* 9/2011 Irita .................................. 347/21
2012/0026237 A1 2/2012 Hakiri et al.
2012/0242741 A1 9/2012 Hasegawa et al.
2014/0072779 A1 3/2014 Matsuyama et al.
2014/0120331 A1 5/2014 Koizuka et al.

FOREIGN PATENT DOCUMENTS

| JP | 2007-153985 | 6/2007 |
| JP | 2007-291166 | 11/2007 |
| JP | 2008-88253 | 4/2008 |
| JP | 2011-122072 | 6/2011 |
| JP | 2012-51357 | 3/2012 |
| JP | 2012-97371 | 5/2012 |

* cited by examiner

INK FOR INKJET RECORDING, AND INK CARTRIDGE, INKJET RECORDING METHOD, INKJET RECORDER, INK-RECORDED MATTER AND METHOD OF PRODUCING THE INK-RECORDED MATTER USING THE INK

CROSS-REFERENCE TO RELATED APPLICATIONS

This patent application is a divisional of U.S. application Ser. No. 14/096,320 filed Dec. 4, 2013 which is based on and claims priority pursuant to 35 U.S.C. §119 to Japanese Patent Application No. 2013-005951, filed on Jan. 17, 2013, in the Japan Patent Office, the entire disclosure of which is hereby incorporated by reference herein.

BACKGROUND

1. Technical Field

The present invention relates to an ink for inkjet recording, an ink cartridge, an inkjet recording method, an inkjet recorder, an ink-recorded matter and a method of producing the ink-recorded matter using the ink.

2. Description of the Related Art

Recently, inkjet recording methods have been popular as image forming methods because of having advantages of having simpler process and easier full-colorization than the other recording methods, and producing high-resolution images even with an apparatus having simple composition. The inkjet recording methods have a small amount of ink soar and adhere to recording media such as papers to form images thereon with an inkjet recorder, and applications thereof are expanding, e.g., personal and industrial printers and printings.

In the inkjet recorder, an aqueous ink using a water-soluble dye is mostly used as a colorant. However, the ink has disadvantages of having poor weatherability and water resistance. Therefore, a pigment ink using a pigment instead of the water-soluble dye has been studied recently. However, the pigment ink is still inferior to the dye ink in colorability, ink discharge stability and preservation stability. In company with improvement of higher-quality image technology of OA printers, even when recorded on plain papers as recording media with the pigment ink, image density equivalent to that of the dye ink is required. However, the pigment ink penetrates into a plain paper as a recording medium and pigment density at the surface of the paper lowers, resulting in lower image density. In order to dry the ink adhering to the recording medium quicker to print quicker, a penetrant is added to the ink for water to penetrate into the recording medium. Then, not only water but also pigment penetrates deeper into the recording medium, resulting in lower image density.

Various methods are disclosed to improve image density. For example, Japanese published unexamined application No. JP-2011-122072-A discloses an ink used for recording on a paper including a water-soluble multivalent metal salt. The ink includes (a) a pigment and (b) at least one compound having no surface activating ability, a molecular weight of from 150 to 10,000, and a content rate of phosphorous ((p/molecular weight)×100) from a functional group selected from a functional group having a basic skeleton of phosphoric acid and functional group having a basic skeleton of phosphonic acid not less than 1.4. Further, the ink includes the (b) compound of from 1.5 to 10.0% by weight.

Japanese published unexamined application No. JP-2007-153985-A discloses an aqueous ink for inkjet recording, essentially including carbon black or an organic pigment, a polymer, a basic material and water. The ink includes a copolymer essentially including a (meth)acrylic acid and other copolymerizable monoethylene unsaturated monomers and a copolymer essentially including monoethylene unsaturated monomers including a phosphoric acid group and other copolymerizable monoethylene unsaturated monomers.

Japanese published unexamined application No. JP-2004-277519-A discloses an inkjet ink including a pigment, a resin having a weight-average molecular weight of from 1,000 to 50,000 and a phosphoric acid group and a solvent having a boiling point not less than 130° C., and a viscosity o from 3 to 15 mPa·s at a temperature of the head when discharging the ink.

However, the ink disclosed in Japanese published unexamined application No. JP-2011-122072-A does not sufficiently improve image density on a plain paper having a low content rate of a water-soluble multivalent metal salt.

The ink disclosed in Japanese published unexamined application No. JP-2007-153985-A does not produce images having sufficient image density when the content of the monoethylene unsaturated monomers including a phosphoric acid group in the copolymer is low. When the content is increased, the carbon black or the organic pigment may unstably be dispersed in the ink.

The ink disclosed in Japanese published unexamined application No. 2004-277519-A is not an aqueous ink and supposed to be used on a film as a recording medium. Improvement of image density on a plain paper by reaction between the metallic ion and the phosphoric acid cannot be expected. Further, since the dispersant stabilizes dispersion of a pigment in a nonaqueous solvent, a pigment may be unstably dispersed in an aqueous ink when the same dispersant is used therein.

Namely, the inks disclosed in Japanese published unexamined applications Nos. JP-2011-122072-A, JP-2007-153985-A and JP-2004-277519-A do not produce images having high image density on a plain paper including no or a low content rate of a water-soluble multivalent metal salt.

Because of these reasons, a need exists for an ink for inkjet recording, which produces images having high image density even on a plain paper including no or a low content rate of a water-soluble multivalent metal salt, and in which a pigment is stably dispersed.

SUMMARY

Accordingly, one object of the present invention is to provide an ink for inkjet recording, which produces images having high image density even on a plain paper including no or a low content rate of a water-soluble multivalent metal salt, and in which a pigment is stably dispersed.

Another object of the present invention is to provide an ink cartridge containing the ink for inkjet recording.

A further object of the present invention is to provide an inkjet recording method using the ink for inkjet recording.

Another object of the present invention is to provide an inkjet recorder using the ink for inkjet recording.

A further object of the present invention is to provide an ink-recorded matter recorded by the ink for inkjet recording.

Another object of the present invention is to provide a method of producing the ink-recorded matter recorded by the ink for inkjet recording.

These objects and other objects of the present invention, either individually or collectively, have been satisfied by the discovery of an ink for inkjet recording, which is used for recording on a paper having a concentration of an eluted Ca ion of from $1.0 \times 10^{-4}$ to $5.0 \times 10^{-4}$ g/g when dipped in pure water. The ink includes at least a pigment, a pigment dispersant, a water-soluble organic solvent and water. The pigment dispersant is a copolymer synthesized using at least (1) unsaturated ethylene monomer having a phosphoric acid group or a phosphonic acid group and (2) unsaturated ethylene monomer having an alkyl group having 12 to 22 carbon atoms.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
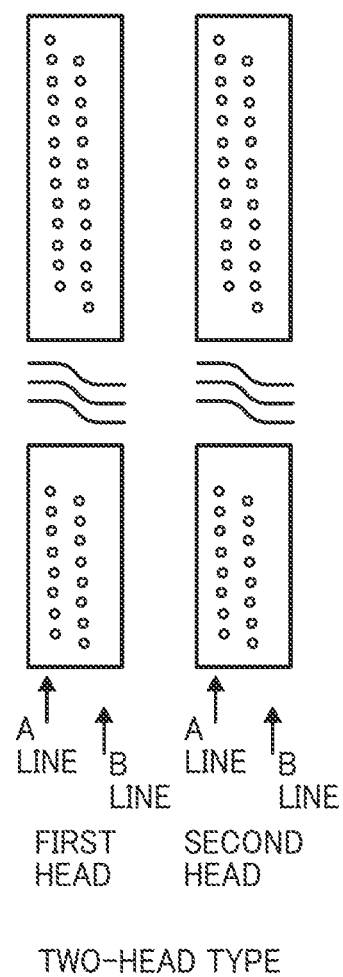
FIG. 1 is a schematic plain view illustrating an embodiment of a recording head (two-head type) equipped in the inkjet recorder of the present invention.

The present invention provides an ink for inkjet recording, which produces images having high image density even on a plain paper including no or a low content rate of a water-soluble multivalent metal salt, and in which a pigment is stably dispersed.

The phosphoric acid group and the phosphonic acid group are hydrophilic, but hydrophobized when reacted with ions such as Ca ion, Mg ion and Al ion. Therefore, an ink using a copolymer including the phosphoric acid group and the phosphonic acid group as a pigment dispersant is used on a recording medium including a water-soluble multivalent metal salt, the pigment dispersant is reacted with a multivalent metal ion eluted from the recording medium to be hydrophobized and the pigment agglomerates. As a result, the pigment becomes difficult to penetrate in a paper and the resultant image has higher image density.

However, since the multivalent metal ion is scarcely eluted from a plain paper including no or a low content rate of a water-soluble multivalent metal salt, the image density hardly improves due to the pigment agglomeration.

As a method of solving the problem, a method of increasing a ratio of the phosphoric acid group or the phosphonic acid group in the copolymer is thought. However, when the ratio is increased, interactions between the phosphoric acid groups or the phosphonic acid groups become strong, resulting in deterioration of pigment dispersibility and increase of viscosity of a mixture of the pigment dispersion and the water-soluble organic solvent.

Therefore, conventionally, the copolymer needs to include the monomer including the phosphoric acid group or the phosphonic acid group in an amount less than 20% by weight.

In the present invention, the monomer (2) is used together such that even a plain paper including calcium carbonate which is an insoluble metal salt as a main source of eluted metal ion for the reaction agglomeration, and almost no water-soluble multivalent metal salt has high image density.

It is thought this is thought because of the following reasons (a) and (b).

(a) The monomer (2) increases affinity between the copolymer and the pigment, the copolymer which is a pigment dispersant and the pigment are difficult to separate from each other in a pigment dispersion and an ink, and the pigment is stably dispersed therein. Therefore, the monomer (1) can be increased to increase reactivity with a metal ion on the surface of a paper.

(b) The monomer (2) increases affinity between the copolymer and the pigment, and a rate of the pigment the copolymer is adsorbed to increases. As a result, when the phosphoric acid group or the phosphonic acid group in the copolymer reacts with Ca ion on the surface of a paper, a rate of the agglomerated pigment increases and even a slight amount of Ca ion improves image density.

The ink of the present invention is effectively used on a paper eluting Ca ion in an amount of from $1.0 \times 10^{-4}$ to $5.0 \times 10^{-4}$ g/g.

When less than $1.0 \times 10^{-4}$ g/g, improvement of the image density due to reaction agglomeration with the pigment dispersant deteriorates. When greater than $5.0 \times 10^{-4}$ g/g, an ink noticeably becomes difficult to penetrate a paper and poorly dried, resulting in deterioration of scratch resistance and marker resistance.

Ca ion amount eluted from a paper is calculated by the following method.

Namely, a paper is cut to paper slips of 2.5 cm ($\pm 0.5$ cm)$\times$3.5 cm ($\pm 0.5$ cm), and 16 g thereof are dipped in 200 g of high-purity water (25° C.) for 40 hrs. The high-purity water after the paper slips are dipped therein is filtered with a 0.8 µm cellulose acetate filter (from Advantech Co., Ltd.) to remove foreign particles such as paper dusts, and Ca ion included therein is determined by an ICP emission spectrometer. The resultant Ca ion concentration [ppm] is multiplied by 200 g which is the weight of the high-purity water, and further divided by 16 g which is the weight of the paper dipped to determine an amount of Ca ion [g/g] eluted from the paper.

<Pigment Dispersant>

The ink of the present invention uses the copolymer as a pigment dispersant.

The copolymer is obtained by reacting the monomers (1) and (2) with a polymerization initiator under a nitrogen gas stream, using a solvent in a flask equipped with a stirrer, a thermometer, a nitrogen inlet tube. The other monomers may be added to the monomers (1) and (2).

A viscosity of the copolymer is adjustable by changing a molecular weight thereof. The molecular weight thereof is adjustable by changing a monomer concentration, an amount of the polymerization initiator, a polymerization temperature and a polymerization time.

Known synthesizing methods such as solution polymerization, suspension polymerization, bulk polymerization and emulsification polymerization can be used to synthesize the copolymer. A radical polymerization initiator is preferably used because of simple polymerizing operation and molecular weight adjustment.

Specific examples of radical polymerization initiators include known materials such as peroxyketal, hydroperoxide, dialkylperoxide, diacylperoxide, peroxydicarbonate, peroxyester, cyano azobisisobutylonitrile, azobis(2,2'-isovaleronitrile), non-cyano dimethyl-2,2'-azobisisobutylate, etc. Organic peroxides and azo compounds having an easily-controllable molecular weight and a low decomposition temperature are preferably used, and the azo compounds are more preferably used. The polymerization initiators are preferably used in an amount of from 1 to 10% by weight based on total weight of polymerizable monomers.

In order to control a molecular weight of the copolymer including a salt of phosphonic acid group, chain transfer agents such as mercaptoacetate, mercaptopropionate, 2-propanethiol, thiophenol, dodecylmercaptane, 1-dodecanethiol and thioglycerol may be added in a proper amount.

The polymerization temperature is preferably from 50 to 150° C., and the polymerization time is preferably from 3 to 48 hrs.

Specific examples of the monomer (1) include 2-methacryloxyethylacidphosphate, 2-acryloxyethylacidphosphate, vinyl phosphonic acid, 1-methcryloxyethane-1,1-diphosphonic acid, etc. Marketed products of the 2-methacryloxyethylacidphosphate include Light Ester P-1M from KYOEISHA CHEMICAL CO., LTD. and Phosmer M from Uni-Chemical Co., Ltd. Marketed products of the 2-acryloxyethylacidphosphate include Light Acrylate P-1A from KYOEISHA CHEMICAL CO., LTD.

Specific examples of the monomer (2) include lauryl (meth)acrylate (C12), tridecyl(meth)acrylate (C13), tetradecyl(meth)acrylate (C14), pentadecyl(meth)acrylate (C15), hexadecyl(meth)acrylate (C16), heptadecyl(meth)acrylate (C17), stearyl(meth)acrylate (C18), nonadecyl(meth)acrylate (C19), eicosyl(meth)acrylate (C20), heneicosyl(meth)acrylate (C21), docosyl(meth)acrylate (C22), etc. C12 to C22 represent the number of carbon atoms of the alkyl groups.

It is preferable that the phosphoric or the phosphonic acid group in the copolymer is partly or all neutralized by a base to be ionized. Specific examples of the base include alkali metal hydroxides such as lithium hydroxide, potassium hydroxide and a sodium hydroxide; ammonium; mono, di or trimethylamine; mono ethanol amine; diethanolamine; triethanolamine; methylethanolamine; methyldiethanolamine; dimethylethanolamine; monopropanolamine; dipropanolamine; tripropanolamine; isopropanolamine; trishydroxymethylaminomethane; aminoethyl propanediol; and organic amines, e.g., organic ammoniums such as tetramethylammonium, tetraethylammonium and tetrabutylammonium; and cyclic amines such as morpholine, N-methylmorpholine, N-methyl-2-pyrrolidone and 2-pyrrolidone.

A weight ratio [(1)/(2)] of the monomer (1) to the monomer (2) in the copolymer is preferably from 0.1 to 10. When less than 0.1, reactivity between Ca ion eluted from a paper and a pigment dispersant lowers and image density slightly lowers. When greater than 10, the pigment dispersant and the ink slightly deteriorate in preservation stability.

The copolymer preferably has a weight-average molecular weight of from 4,000 to 60,000, and more preferably from 5,000 to 50,000. When less than 5,000, reactivity between Ca ion eluted from a paper and a pigment dispersant lowers and image density slightly lowers. When greater than 50,000, the pigment dispersant a slightly deteriorates in preservation stability.

The ink of the present invention preferably includes the pigment dispersant in an amount of from 1 to 100 parts by weight, and more preferably from 5 to 80 parts by weight per 100 parts by weight of the pigment. In this range, the pigment has a most suitable particle diameter, and the image density, dispersion stability and preservation stability are improved.

The ink of the present invention uses water as a medium and includes a water-soluble solvent for the purpose of preventing the ink from being dried and improving dispersion stability of the pigment.

The water-soluble solvents are not particularly limited, and polyol having an equilibrium water content not less than 40% by weight in an environment of 23° C. and 80% Rh is preferably used. The polyols are not particularly limited, and a water-soluble solvent A having a boiling point greater than 250° C. at normal pressure and a water-soluble solvent B having a boiling point not less than 140° C. and less than 250° C. at normal pressure are preferably used together. When the water-soluble solvents A and B are used in combination, a weight ratio (B/A) of the water-soluble solvent B to the water-soluble solvent A is preferably from 10/90 to 90/10 although depending not a little on an amount of a water-soluble solvent C mentioned later and other additives such as a penetrant. Potassium chloride saturated aqueous solution is placed in a desiccator in which 23±1° C. and 80±3% Rh are maintained and a petri dish on which each 1 g of the water-soluble solvents is placed is stored in the desiccator to determine the equilibrium water content from a saturated amount of water.

Saturated amount of water(%)=(amount of water absorbed in an organic solvent/organic solvent)×100

Specific examples of the water-soluble solvent A include 1,2,3-butanetriol, 1,2,4-butanetriol (bp 190 to 191° C./24 hPa), glycerin (bp 290° C.), diglycerin (bp 270° C./20 hPa), triethylene glycol (bp 285° C.), tetraethylene glycol (bp 324 to 330° C.), etc.

Specific examples of the water-soluble solvent B include diethylene glycol (bp 245° C.), 1,3-butanediol (bp 203 to 204° C.), etc.

The ink may include a water-soluble solvent C or a solid wetter instead of a part of the water-soluble solvents A and B or in addition thereto when necessary.

Specific examples of the water-soluble solvent C or the solid wetter include polyol, polyol alkyl ethers, polyol aryl ether, nitrogen-containing heterocyclic compounds, amides, amines, sulfur-containing compounds, propylene carbonate, ethylene carbonate, other water-soluble solvents, etc.

Specific examples of the polyol include dipropylene glycol (bp 232° C.), 1,5-pentanediol (bp 242° C.), 3-butanediol (bp 203° C.), propylene glycol (bp 187° C.), 2-methl-2,4-pentanediol (bp 197° C.), ethylene glycol (bp 196 to 198° C.), tripropylene glycol (bp 267° C.), hexylene glycol (bp 197° C.), polyethylene glycol (viscosity liquid to solid), polypropylene glycol (bp 187° C.), 1,6-hexanediol (bp 253 to 260° C.), 1,2,6-hexanetriol (bp 178° C.), trimethylolethane (solid, mp 199 to 201° C.), trimethylolpropane (solid, mp 61° C.), etc.

Specific examples of the polyol alkyl ethers include ethyleneglycolmonoethylether (bp 135° C.), ethyleneglycolmonobutylether (bp 171° C.), ethyleneglycolmonomethylether (bp 194° C.), diethyleneglycolmonobutylether (bp 231° C.), ethyleneglycolmono-2-ethylhexylether (bp 229° C.), propyleneglycolmonoethylether (bp 132° C.), etc.

The ink preferably includes the water-soluble solvent in an amount of from 10 to 50% by weight.

Inorganic pigments and organic pigments can be used as the pigment. These can be used alone or in combination.

Specific examples of the inorganic pigments include titanium oxide, iron oxide, calcium carbonate, barium sulfate, aluminum hydroxide, barium yellow, cadmium red, chrome yellow and carbon black, etc. Among them, the carbon black is preferably used. The carbon black is produced by known methods such as a contact method, a furnace method, and a thermal method.

Specific examples of the organic pigment include azo pigments, azomethine pigments, polycyclic pigments, dye chelate, a nitro pigment, a nitroso pigment, aniline black, etc. Among them, the azo pigments and the polycyclic pigments are preferably used.

Specific examples of the azo pigments include azo lake, an insoluble azo pigment, a condensed azo pigment, a chelate azo pigment, etc. Specific examples of the polycyclic pigments include a phthalocyanine pigment, a perylene pigment, a perinone pigment, an anthraquinone pigment, a quinacridon pigment, a dioxazine pigment, an indigo pigment, a thioindigo pigment, an iso-indolinone pigment, a quinophtharone pigment, etc. Specific examples of the dye chelate include basic dye chelate, acid dye chelate, etc.

Specific examples of the pigment for black ink include carbon black (C.I. Pigment Black 7) such as furnace black, lamp black, acetylene black, and channel black; metals such as copper, iron (C.I. Pigment Black 11); metal oxides such as titanium oxide; and organic pigments such as aniline black (C.I. Pigment Black 1).

The carbon black preferably has an average primary particle diameter of from 15 to 40 nm, a BET specific surface area of from 50 to 300 $m^2/g$, a DBP oil absorption of from 40 to 150 mL/100 g, a volatile matter content of from 0.5 to 10%, and a pH of from 2 to 9.

Specific examples of marketed products of the carbon black include No. 2300, No. 900, MCF-88, No. 3, No. 40, No. 45, No. 52, MA7, MA8, MA100 and No. 2200n from Mitsubishi Chemical Corp.; Raven 700, 5750, 5250, 5000, 3500 and 1255 from Columbian Chemicals Company; Regal 400R, 330R, 660R, Mogul L, Monarch 700, 800, 880, 900, 1000, 1100, 1300, Monarch 1400 from Cabot Corp.; Color Black FW1, FW2, FW2V, FW18, FW200, S150, S160, S170 from Degussa AG; Printex 35, U, V, 140U, 140V from Degussa AG; Special Black 6, 5, 4A, 4 from Degussa AG; etc.

Specific examples of the pigment for yellow ink include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 154, C.I. Pigment Yellow 155, C.I. Pigment Yellow 174, C.I. Pigment Yellow 180, etc.

Specific examples of the pigment for magenta ink include C.I. Pigment Red 5, C.I. Pigment Red 7, C.I. Pigment Red 12, C.I. Pigment Red 48 (Ca), C.I. Pigment Red 48 (Mn). C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, Pigment Violet 19, etc.

Specific examples of the pigment for cyan ink include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66, Bat Blue 4, Bat Blue 60, etc.

New pigments may be used in the present invention. The above pigments may be used together therewith as long as the effect is not impaired.

When Pigment Yellow 74 as a yellow pigment, Pigment Red 122 or a Pigment Violet 19 as a magenta pigment and a Pigment Blue 15:3 as a cyan pigment are used, a well-balanced ink having good color tone and light resistance can be obtained.

Further, in the present invention, a surfactant such as a dispersant and a pigment coated with a resin, which is subjected to graft process or a capsule process can be used. The copolymer is preferably used as the dispersant.

The ink preferably includes the pigment in an amount of from 0.1 to 20.0% by weight.

The pigment preferably has a volume-average particle diameter (D50) not greater than 150 nm.

The volume-average particle diameter (D50) of the pigment us measured by Microtrac UPA from NIKKISO CO., LTD. in an environment of 23° C. and 55% RH.

The ink of the present invention can include other components when necessary. Specific examples thereof include a dispersant, a penetrant, a pH adjuster, a water-dispersible resin, an antiseptic and antifungal agent, a chelate reagent, an antirust agent, an antioxidant, an UV absorber, an oxygen absorber, a light stabilizer, etc.

Specific examples of the dispersant include surfactants such as anionic surfactants, cationic surfactant, ampholytic surfactants and nonionic surfactants; and polymeric dispersants.

Specific examples of the anionic surfactant include alkylsulfocarboxylic acid salts, α-olefinsulfonic acid salts, polyoxyethylene alkyl ether acetic acid salts, N-acylamino acids or salts thereof, N-acylmethyltaurine salts, alkylsulfuric acid salts, polyoxyalkyl ether sulfuric acid salts, alkylsulfuric acid salts, polyoxyethylene alkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, etc.

Specific examples of the cationic surfactant include 2-vinylpyridine derivatives, poly4-vinylpyridine derivatives, etc.

Specific examples of the amphoteric surfactant include betaine lauryldimethylamino acetate, 2-alkyl-N-carboxymethyl-N-hydroxyethylimidazolinium betaine, betaine coconut oil fatty acid amidopropyldimethylamino acetate, polyoctylpolyaminoethylglycine, imidazoline derivatives, etc.

Specific examples of the nonionic surfactant include: ether based surfactants such as polyoxyethylene nonylphenyl ether, polyoxyethylene octylphenyl ether, polyoxyethylene dodecyl phenyl ether, polyoxyethylene octylphenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene glycol (alcohol) based surfactants such as 2,4,7,9-tetramethyl-5-decyne-4,7-diol, 3,6-dimethyl-4-octyne-3,6-diol and 3,5-dimethyl-1-hexine-3-ol, etc.

The penetrant preferably includes polyols or glycol ethers having 8 to 11 carbon atoms.

The penetrant has smaller wettability than a wetter and can be said to be a "non-wettable medium". It more preferably has a solubility of 0.2% by weight to 5.0% by weight in water at 25° C., and 2-ethyl-1,3-hexanediol [solubility: 4.2% (25° C.)], 2,2,4-trimethyl-1,3-pentanediol [solubility: 2.0% (25° C.)] are particularly preferable.

The other penetrants include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol, etc.

The penetrant other than the above that can be used in combination is not particularly limited as long as it dissolved in the pre-treatment liquid for adjusting to desired physical properties, and it may be appropriately selected according to purpose. Examples thereof include: alkyl and aryl ethers of a polyhydric alcohol such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohols such as ethanol.

The ink preferably includes the penetrant in an amount of from 0.1 to 4.0% by weight. When less than 0.1% by weight, the image may not quickly be dried and blurred. When greater than 4.0% by weight, the pigment may not be stably dispersed, nozzle may be clogged, the ink may penetrate a recording medium too much, image density may lower or bleed-through may occur.

The pH adjuster is not particularly limited as long as it may adjust a pH of the aqueous ink being prepared to 8.5 to 11, and preferably from 9 to 11 without adversely affecting the ink. When less than 8.5 or greater than 11, inkjet head or ink feed unit may be melted out so much that the ink may be denatured, leak or poorly discharge. Further, when less than 8.5, the ink lowers in pH when stored and polymeric particles may increase in diameter and agglomerate. The pH of the ink is measured by a pH meter HM-30R from TOA-DKK CORPORATION.

Specific examples of the pH adjuster include alcohol amines, hydroxides of an alkali metal element, hydroxides of ammonium, hydroxides of phosphonium, and carbonates of an alkali metal.

Specific examples the alcohol amines include diethanolamine, triethanolamine, and 2-amino-2-ethyl-1,3-propanediol. Specific examples the hydroxides of an alkali metal element include lithium hydroxide, sodium hydroxide and potassium hydroxide. Specific examples of the hydroxides of ammonium include ammonium hydroxide and quaternary ammonium hydroxide. Specific examples of the hydroxides of phosphonium include quaternary phosphonium hydroxide. Specific examples of the carbonates of an alkali metal include lithium carbonate, sodium carbonate and potassium carbonate.

The water-dispersible resin preferably has good film formability (image formability), high repellency and high weatherability to form an image having high repellency and high image density (high colorability).

Specific examples of the water-dispersible resin include condensed synthetic resins such as polyester resins, polyurethane resins, epoxy resins, polyamide resins, polyether resins, (meth)acrylic resins, acrylic-silicone resins and fluorine-containing resins; additional synthetic resins such as polyolefin, polystyrene resins, polyvinylalcohol resins, polyvinyl ester resins, polyacrylic resins and unsaturated carboxylic resins; and natural polymers such as celluloses, rosins and natural rubbers, which may be used in combination. Among these, polyurethane resin fine particles, acrylic-silicone resin fine particles and fluorine-containing resin fine particles are preferably used.

A volume-average particle diameter (D50) of the water-dispersible resin is related with a viscosity of a dispersion liquid. The smaller the particle diameter, the larger the viscosity when the composition is the same. The volume-average particle diameter (D50) of the water-dispersible resin is preferably not less than 50 nm so that the ink may not have too high a viscosity. When the particle diameter is some ten μm, the resin cannot be used because of being larger than the nozzle of inkjet head. Even when smaller than the nozzle, the large-size particles in the ink deteriorates discharge stability thereof. Therefore, the volume-average particle diameter (D50) of the water-dispersible resin is more preferably not greater than 200 nm so as not to impair discharge stability of the ink. The volume-average particle diameter (D50) of the pigment us measured a dynamic light scattering method using Microtrac UPA from NIKKISO CO., LTD. in an environment of 23° C. and 55% RH.

The water-dispersible resin preferably fixes a pigment dispersion on a paper and films it at normal temperature to improve fixability of the pigment. Therefore, the water-dispersible resin preferably has a minimum filming temperature (MFT) not greater than 30° C. The water-dispersible resin preferably has a glass transition temperature not less than −30° C. because the resin film has higher viscosity, which causes tack of the printed matter.

The ink preferably includes the water-dispersible resin in an amount of from 1 to 15% by weight, and more preferably from 2 to 7% by weight.

Specific examples the antiseptic and antifungal agent include sodium dehydroacetate, sodium sorbate, 2-pyridinethiol 1-oxide sodium, sodium benzoate, sodium pentachlorophenol, etc.

Specific examples of the chelate reagent include sodium ethylenediaminetetraacetate, sodium nitrilotriacetate, sodium hydroxyethylethylenediamine triacetate, sodium diethylenetriamine pentaacetate, sodium uramildiacetate, etc.

Specific examples the antirust agent include acid sulfite, sodium thiosulfate, ammonium thiodiglycolate, diisopropyl ammonium nitrite, pentaerythritol tetranitrate, dicyclohexylammonium nitrite, etc.

Specific examples of the antioxidant include a phenol-based antioxidant (including a hindered phenol-based antioxidant), an amine-based antioxidant, a sulfur-based antioxidant, a phosphorus-based antioxidant, etc Specific examples of the UV absorber include a benzophenone-based UV absorber, a benzotriazole UV absorber, a salicylate-based UV absorber, a cyanoacrylate-based UV absorber, a nickel complex salt-based UV absorber etc.

The ink is manufactured by dispersing or dissolving water, the water-soluble organic solvent, the pigment, the copolymer including a phosphoric acid group or a phosphonic acid group, and the other components when necessary, in an aqueous medium, and further by stirring and mixing according to necessity. The dispersion can be made by using a sand mill, a homogenizer, a ball mill, a paint shaker, an ultrasonic disperser, and the stirring and mixing can be made by using ordinary stirring blades, a magnetic stirrer, and a high-speed disperser, for example.

Physical properties of the ink of the present invention are not particularly limited and may be appropriately selected according to purpose.

A viscosity of the aqueous ink at 25° C. is preferably 3 to 20 mPa·s. An effect of improved print density and letter quality may be obtained with the viscosity being 3 mPa·s or greater. At the same time, discharge property may be ensured with the viscosity suppressed to 20 mPa·s or less. Here, the viscosity may be measured at 25° C., for example, using a viscometer (RE-550L, manufactured by Toki Sangyo Co., Ltd.).

Also, static surface tension of the aqueous ink at 25° C. is preferably not greater than 40 mN/m. When greater than 40 mN/m, leveling of the ink on a recording medium is less likely to occur, and drying time may be longer.

The ink cartridge includes a container containing the ink of the present invention and may include other members when necessary.

The container is not particularly limited in shape, structure, size and material, and an ink bag formed of aluminum laminated film or a resin film is preferably used.

The inkjet recording method using the ink for inkjet recording of the present invention preferably includes at least an ink flight process of applying stimulation to the ink thorough an ink flyer to fly the ink from a recording head to record an image on recording media. Namely, the inkjet recording method using the ink for inkjet recording of the present invention includes at least an ink flight process and other processes selected when necessary such as a stimulation generation process and a control process.

The inkjet recorder of the present invention has an ink flight means flying the ink for inkjet recording of the present invention from a recording head to record an image on recording media. Namely, the inkjet recorder of the present invention preferably includes at least a recording head and a maintenance and recovery device, and other means such as a stimulation generator and a controller when necessary.

The ink flight differs according to the stimulation. When the stimulation is heat, a heat energy according to a recording signal is applied from, e.g., a thermal head to the recording ink in a recording head. The heat energy has the recording ink generate bubbles. A pressure of the bubbles discharge the recording ink as a droplet from the nozzle of the recording head. When the stimulation is pressure, e.g., a voltage is applied to a piezo element bonded to a pressure room in an ink flow channel in the recording head. The piezo element bended and the pressure room decreases its capacity to discharge the recording ink as a droplet from the nozzle of the recording head.

The droplet of the ink preferably has a size of from 3 to 40 pl, a spray speed of from 5 to 20 m/s, a drive frequency not less than 1 kHz, and an image resolution not less than 300 dpi.

The recording head preferably includes many nozzles, and a head or a recording unit dripping and discharging the ink with energy. Further, the recording head preferably includes a liquid room, a fluid resistor, an oscillation plate and a nozzle member, and at least a part of the recording head is preferably formed of a material including silicone or nickel. The recording head preferably has a nozzle diameter not greater than 30 μm, and more preferably of from 1 to 20 μm.

The inkjet recorder of the present invention preferably has a sub-tank feeding ink on the recording head, which is filled with ink through a feed rube from an ink cartridge.

The maintenance and recovery device includes at least one suction cap connected with a suction generator, capping the recording head, and one moisturizing cap not connected with the suction generator, capping the recording head, and other means when necessary. The suction cap and the moisturizing cap decrease ink and time consumed for maintaining, and waste of ink more than when all the caps are suction caps.

The maintenance and recovery device is not particularly limited, and one disclosed in Japanese published unexamined application No. JP-2005-170035-A can be used.

The inkjet recorder of the present invention preferably has a reverser reversing recording surfaces of recording media to be duplex printable. The reverser includes a transfer belt having electrostatic force, a recording media holder with air suction, a combination of a transfer roller and a spur, etc. Further, the inkjet recorder of the present invention preferably has an endless transfer belt and a transferer transferring recording media while holding them by the charged transfer belt. In this case, an AC bias of from ±1.2 to +2.6 kV is preferably applied to a charging roller to charge the transfer belt.

The controller is not particularly limited as long as it is capable of controlling operation of each of the means, and includes a sequencer, a computer, etc.

Figure 2:
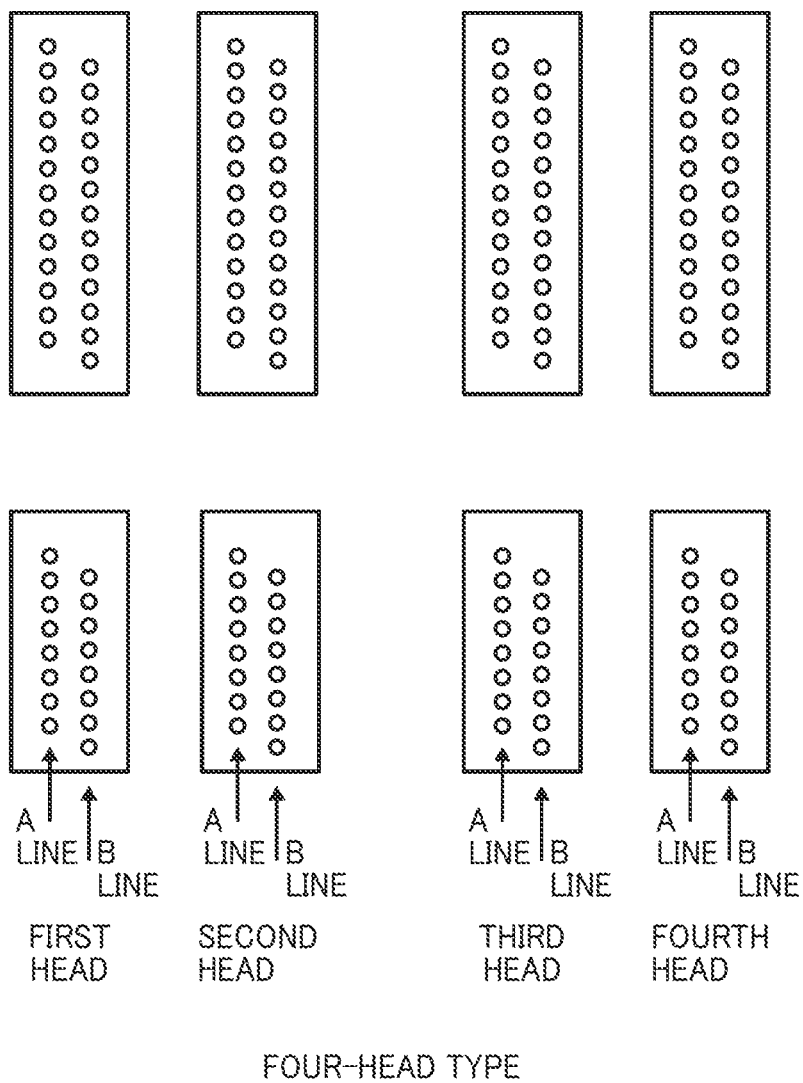
FIG. 2 is a schematic plain view illustrating another embodiment of a recording head (four-head type) equipped in the inkjet recorder of the present invention.

FIGS. 1 and 2 are schematic plain views illustrating embodiments of a recording head equipped in the inkjet recorder, seen from the nozzle surfaces. FIG. 1 is a two-head type formed of a first head and a second head. FIG. 2 is a four-head type formed of a first head, a second head, a third head and a fourth head.

In the two-head type, one of the first head and the second head is capped with a suction cap connected with a suction generator and the other is capped with a moisturizing cap not connected with the suction generator. In FIG. 1, the first head is capped with a suction cap and the second head is capped with a moisturizing cap.

In the four-head type in FIG. 2, at least one of the first to fourth heads is capped with a suction cap connected with a suction generator and the other are capped with moisturizing caps not connected with the suction generator. In FIG. 2, the first head is capped with a suction cap and the second, third and fourth heads are capped with moisturizing caps.

In the two-head type in FIG. 1, yellow (Y), cyan (C), magenta (M) and black (Bk) color inks need to be filled in four nozzle lines, respectively to record full-color images.

Figure 3:
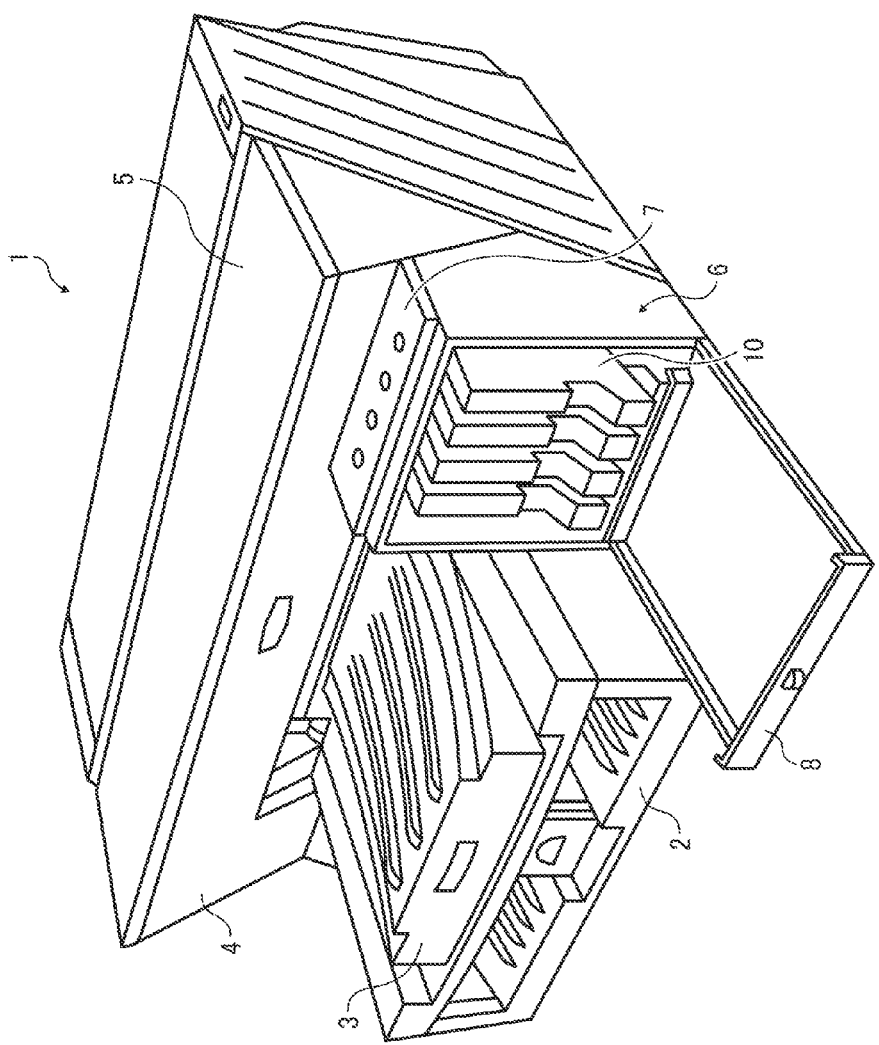
FIG. 3 is a perspective view illustrating an embodiment of the inkjet recorder of the present invention.

FIG. 3 is a perspective view illustrating an embodiment of the inkjet recorder having a maintenance and recovery device of the present invention. The inkjet recorder in FIG. 3 includes an apparatus 1, a paper feed tray 2 filled with papers and a paper discharge tray 3 on which recorded papers (media) are stocked. Further, the inkjet recorder includes a cartridge loader 6 at a side of a front surface 4, projecting forward therefrom and lower than an upper surface 5. Operation keys and a controller 7 are located on the upper surface of the cartridge loader 6. The cartridge loader 6 is loaded with an exchangeable main tank (ink container or ink cartridge) 10 which is a liquid reserve tank, and has an openable and closable front cover 8.

An ink of the ink cartridge is filled in the ink bag from an ink inlet and the ink inlet is sealed with heat after the ink bag is degasified. The ink is fed through a needle inserted into an ink exhaust formed of a rubber. The ink bag is formed of a wrapper made of an air-impermeable aluminum laminated film, etc. The ink bag is typically contained in a plastic cartridge case detachable from various inkjet recorders.

Figure 4:
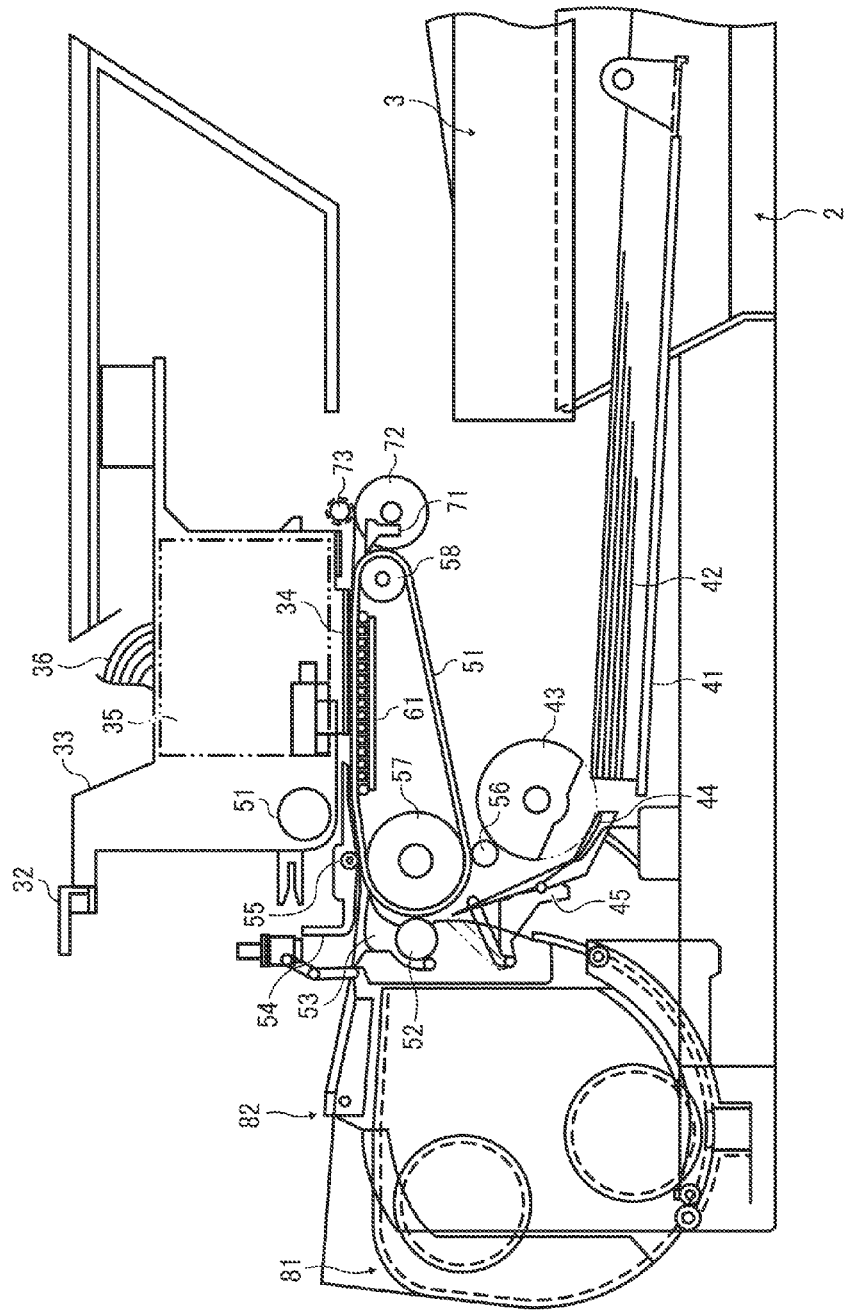
FIG. 4 is a schematic view illustrating an overall structure of the inkjet recorder in FIG. 3.
Figure 5:
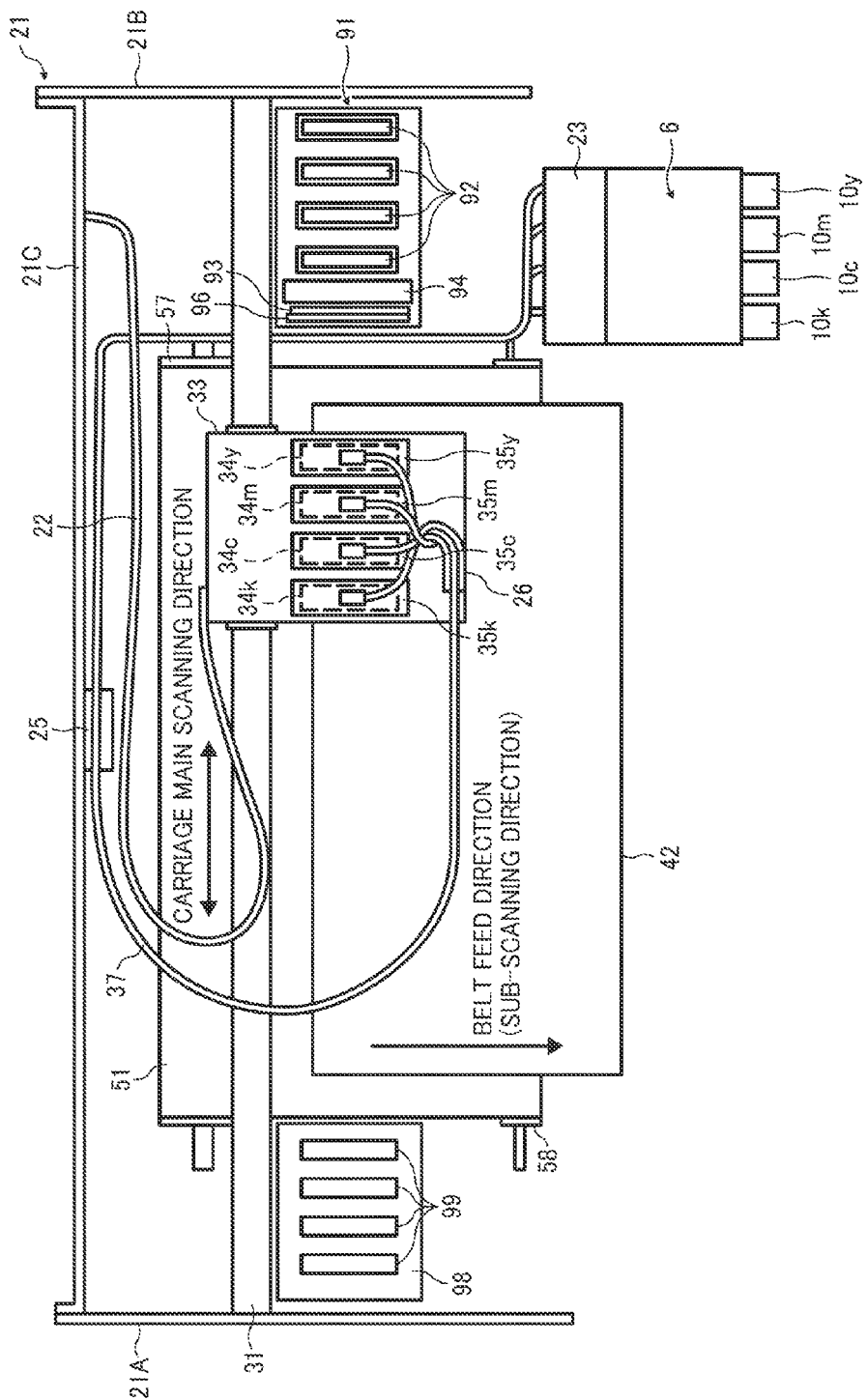
FIG. 5 is a schematic plain view illustrating a main part of the inkjet recorder in FIG. 3.

FIG. 4 is a schematic view illustrating an overall structure of the inkjet recorder in FIG. 3, and FIG. 5 is a schematic plain view illustrating a main part of the inkjet recorder therein.

A guide rod 31 as a guide member and a stay 32 horizontally suspended between side boards 21A and 21B forming a frame 21 slidably hold a carriage 33 in a main scanning direction, and a main scanning motor drives the carriage in the main scanning direction in FIG.

The carriage 33 is loaded with plural recording heads 34 formed of inkjet heads which are droplet discharge heads discharging ink droplets, in which plural nozzles are located in a direction intersecting with the main scanning direction, directing the ink droplet discharge direction downward. The recording heads 34 includes a recording head 34y discharging a yellow (Y) droplet, a recording head 34m discharging a magenta (M) droplet, a recording head 34c discharging a cyan (C) droplet, and a recording head 34k discharging a black (Bk) droplet. Further, one or plural recording heads having one or plural nozzle lines discharging one or plural color droplets can also be used.

The droplet discharge head forming the recording head 34 includes those equipped with a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force as an energy generator to discharge droplets.

The carriage 33 is loaded with sub-tanks 35y, 35m, 35c and 35k for feeding each color ink to each recording head 34. The sub-tank 35 is filled with each color ink from each ink cartridge 10y, 10m, 10c and 10k through each ink-feed tube 37.

The ink cartridge 10 is contained in the cartridge loader 6 as FIG. 5 shows. A feed pump unit 23 feeding ink in the ink cartridge 10 is located in the cartridge loader 6. The ink-feed tube 37 from the cartridge loader 6 to the sub-tank 35 is fixedly held by a holder 25 on a back board 21C forming the frame 21 on the way of being laid.

In FIGS. 4 and 5, 22 is a flexible cable and 36 is an ink-feed tube (sub-tank connector).

As a paper feeder feeding papers 42 loaded on a paper loader (bottom board) 41 of the paper feed tray 2, a semicircular (paper feed) roller 43 and a separation pad 44 formed of a material having a large friction coefficient separating and feeding one by one of the papers 42 from the paper loader 41 are equipped. The separation pad 44 is biased to the paper feed roller 43.

In addition, a transfer belt 51 electrostatically adsorbing a paper 42 and transferring the paper as a transferer transferring the paper 42 fed from the paper feeder below the recording head 34, a counter roller 52 sandwiching the paper 42 fed from the paper feeder through a guide 45 with the transfer belt 51 and transferring the paper, a transfer guide 53 changing the paper 42 fed almost vertically in direction at 90° to place the paper 42 on the transfer belt 51, a head pressure roller 55 biased to the transfer belt 51 by a pressure member 54 are equipped. Further, a charging roller 56 charging the surface of the transfer belt 51 is equipped.

The transfer belt 51 is an endless belt suspended with tension between a transfer roller 57 and a tension roller 58 and is rotated in a belt transfer direction in FIG. 10. A charging roller 56 contacts a surface layer of the transfer belt 51 and rotates in company with rotation of the transfer belt 51, and a pressure of 2.5N is applied to each of both ends of an axis thereof.

On the back of the transfer belt 51, a guide member 61 is located according to a printing area of the recording head 34. The guide member 61 projects more than a tangent line of the two rollers supporting the transfer belt 51 (transfer roller 57 and the tension roller 58) to the recording head 34. Thus, the transfer belt 51 is pressed up and guided by the upper surface of the guide member 61 to maintain high-precision flatness.

Further, to discharge the paper 42 recorded by the recording head 34, a separation claw 71 separating the paper 42 from the transfer belt 51, paper discharge rollers 72 and 73 are equipped, and a paper discharge tray 3 is equipped below the paper discharge roller 72. A distance from the paper discharge rollers 72 and 73 to the paper discharge tray 3 is long to some extent to stock as many papers as possible.

A both-side paper feed unit 81 is detachably installed on the back of the apparatus 1. The both-side paper feed unit 81 reverses the paper 42 retuned by reverse rotation of the transfer belt 51 and feeds the paper between a counter roller 52 and the transfer belt 51 again. A manual paper feeder 82 is located on the upper surface of the both-side paper feed unit 81.

Further, as FIG. 5 shows, in a non-printing area at one side of the scanning direction of the carriage 33, a maintenance and recovery device (sub-system) 91 maintaining and recovering the nozzles of the recording head 34. The subsystem 91 includes cap members (caps) 92a to 92d capping the nozzle surfaces of the recording head 34, a wiper blade 93 which is a blade member wiping the nozzle surfaces, a blank discharge receiver 94 receiving droplets not for recording of blank discharge to discharge thickened ink, a wiper cleaner 95 (FIG. 7) removing ink adhering to the wiper blade 93, which is united with the blank discharge receiver 94, and a cleaner roller 96 pressing the wiper blade 93 to the wiper cleaner 95 when the wiper blade 93 is cleaned.

As FIG. 5 shows, in a non-printing area at the other side of the scanning direction of the carriage 33, a blank discharge receiver 98 receiving droplets not for recording of blank discharge to discharge thickened ink is located, and the discharge receiver 98 has an opening 99 along nozzle line direction of the recording head 34.

In the inkjet recorder, the papers 42 are separately fed one by one from the paper feed tray 2, and the paper 42 fed upward almost vertically is guided by the guide 45 to be fed while sandwiched between the counter roller 52 and the transfer belt 51. Further, the end of the paper 42 is guided by the transfer guide 53 and is pressed against the transfer belt 51 by the head pressure roller 55 to be fed in a direction at an almost 90° turn.

Then, a control circuit applies an alternating voltage repeating positive and negative outputs alternately to the charging roller 56 from a high-voltage electric source, and the transfer belt 51 is zonally and alternately charged positively and negatively in a sub-scanning direction. When the paper 42 is fed onto the positively and negatively charged transfer belt 51, the paper 42 is electrostatically adsorbed to the transfer belt 51, and the paper 42 is fed in a sub-scanning direction by rotation of the transfer belt 51. The recording head 34 is driven according to an image signal while the carriage 33 is moved to discharge ink to the paper 42 and record one line thereon. After the paper 42 is transferred for a predetermined distance, the following line is recorded. Receiving a record finish signal or a signal representing a tail end of the paper 42 reaches the recording area, recording operation is finished and the paper 42 is discharged on the paper feed tray 3.

When ready to print, the carriage 33 is moved to the subsystem 91, the recording head is capped with the cap member 92 to moisturize the nozzle to prevent defective discharge due to dried ink. The cap member 92 caps the recording head 34 to suction ink from the nozzle to perform recovery operation discharging thickened ink and bubbles. Before and while recording, blank discharge of the ink not recording is performed. This maintains stable dischargeability of the recording head 34.

Figure 6:
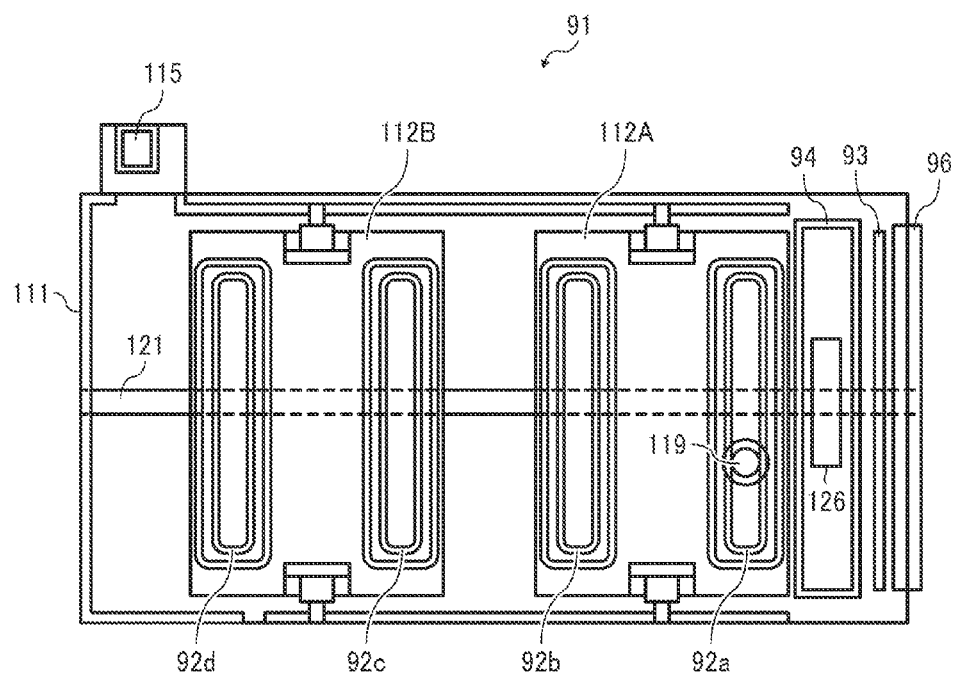
FIG. 6 is a schematic plain view illustrating a main part of a subsystem including a maintenance and recovery device in the inkjet recorder of the present invention.
Figure 7:
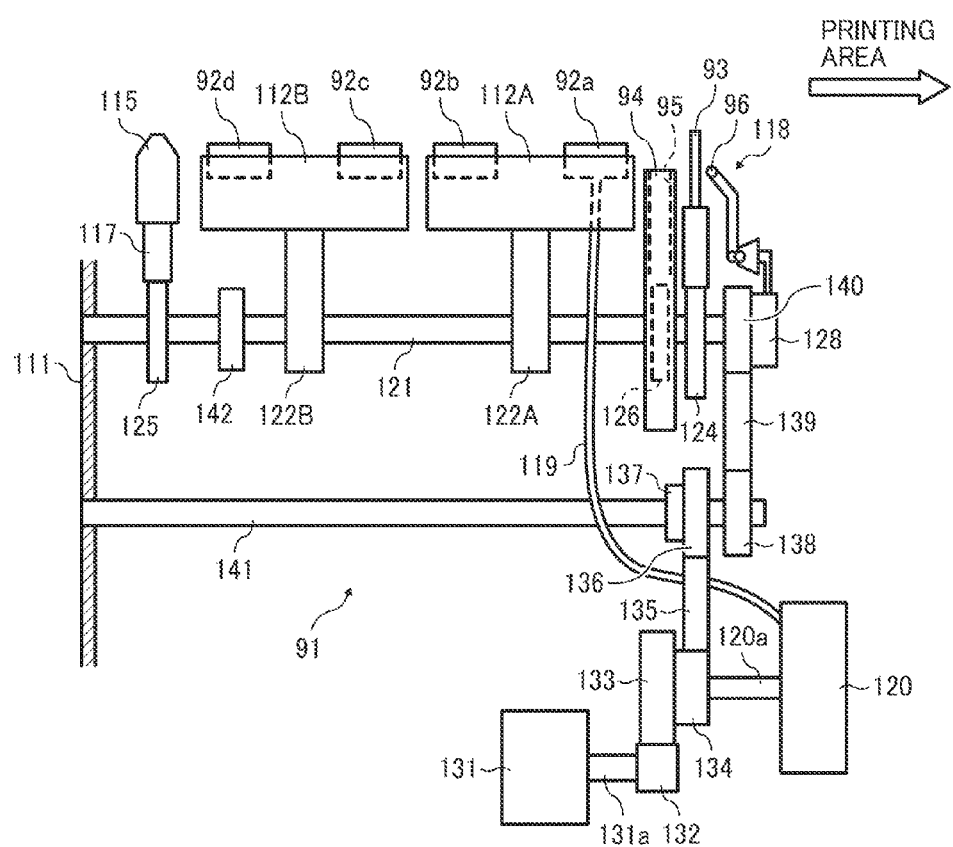
FIG. 7 is a schematic view illustrating the subsystem in FIG. 6.
Figure 8:
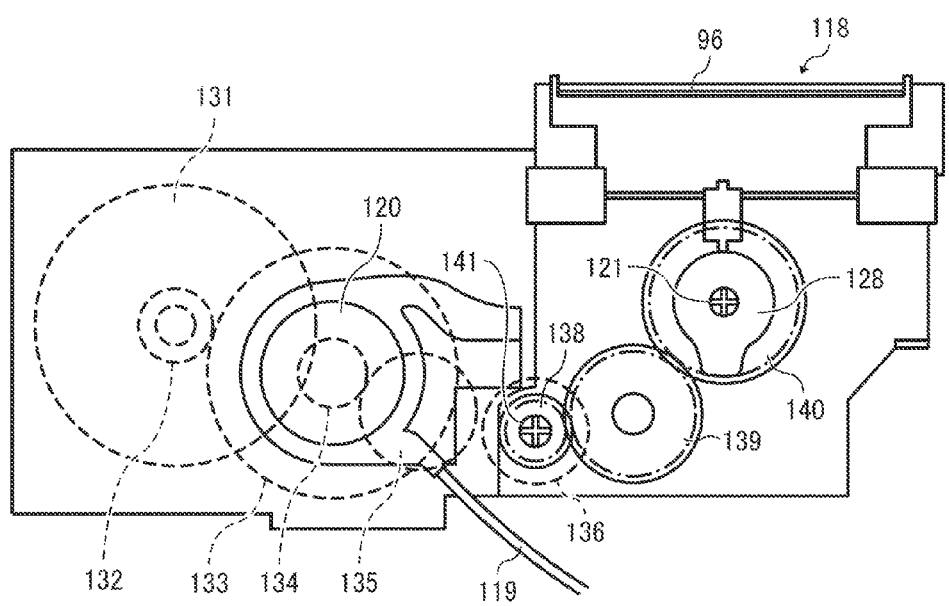
FIG. 8 is a schematic view illustrating the right side of the subsystem in FIG. 6.

FIG. 6 is a schematic plain view illustrating a main part of a subsystem 91 including the maintenance and recovery device (subsystem 91) in the inkjet recorder of the present invention. FIG. 7 is a schematic view illustrating the subsystem in FIG. 6. FIG. 8 is a schematic view illustrating the right side of the subsystem in FIG. 6.

A frame 111 of the subsystem 91 holds two cap holders 112A and 112B holding the cap, a wiper blade 93 which is a wiping member including an elastic body as a cleaner, and a carriage lock 115, which are all vertically movable. A blank discharge receiver 94 is located between the wiper blade 93 and the cap holder 112A. To clean the wiper blade 93, a wiper cleaner 118 including a cleaner roller 96 pressing the wiper blade 93 to a wiper cleaner 95 cleaning the blank discharge receiver 94 from the outside is swingably held.

The cap holders 112A and 112B hold two caps 92a and 92b, and 92c and 92d capping the nozzle surface of two recording heads 34, respectively.

A tubing (suction) pump 120 is connected with the cap 92a held by the cap holder 112A through a flexible tube 119, and the tubing pump 120 is connected with each of the other caps 92b, 92c and 92d. Namely, only the cap 92a is a suction (recovery) and moisturizing cap and each of the other caps 92b, 92c and 92d is simply a moisturizing cap. Therefore, when recovery operation of the recording head 34 is performed, the recording head 34 is selectively moved to a position where it can be capped by the cap 92a.

Below the cap holders 112A and 112B, a cam shaft 121 is rotatably supported by the frame 111. The cam shaft 121 includes cap cams 122A and 122B elevating the cap holders 112A and 112B, a wiper cam 124 elevating the wiper blade 93, a carriage lock cam 125 elevating the carriage lock 115 through a carriage lock arm 117, a roller 126 droplets discharged in the blank discharge receiver 94 land on, and a cleaner cam 128 swinging the wiper cleaner 118.

The cap 92 is elevated by the cap cams 122A and 122B. The wiper blade 93 is elevated by the wiper cam 124. When the wiper blade 93 descends while the wiper cleaner 118 come out to be sandwiched between the cleaner roller 96 of the wiper cleaner 118 and the wiper cleaner 95 of the blank discharge receiver 94, ink adhering to the wiper blade 93 is scraped off in the blank discharge receiver 94.

The carriage lock 115 is biases upward (lock direction) by a compressed spring to be elevated through the carriage lock arm 117 driven by the carriage lock cam 125. In order to rotate the tubing pump 120 and the cam shaft 121, a pump gear 133 formed on a pump shaft of the tubing pump 120 is engaged with a motor gear 132 formed on a motor shaft 131a of a motor 131. Further, an intermediate gear 136 having a one-direction clutch is engaged with an intermediate gear 134 united with the pump gear 133 through an intermediate gear 135. A cam gear 140 fixed on the cam shaft 121 is engaged with an intermediate gear 138 having the same shaft as that of the intermediate gear 136. An intermediate shaft 141 which is a rotational shaft of the intermediate gear 136 having a clutch 137 and the intermediate gear 138 is rotatably held by the frame 111.

The subsystem 91 has a home position sensor cam 142 detecting a home position. The home position sensor operates a home position lever when the cap 92 comes to the lowest end and the sensor is open to detect a home position of the motor 131 (except for the pump 120. When the power is on, the cap 92 (cap holder 112) elevates regardless of its position and does not detection the position until starts moving. After the cap 92 detects the home position (while ascending), the cap 92 moves for a fixed distance to lowest end. Then, the carriage moves right and left and returns to a cap position after detecting the position, and the recording head 34 is capped.

Figure 9:
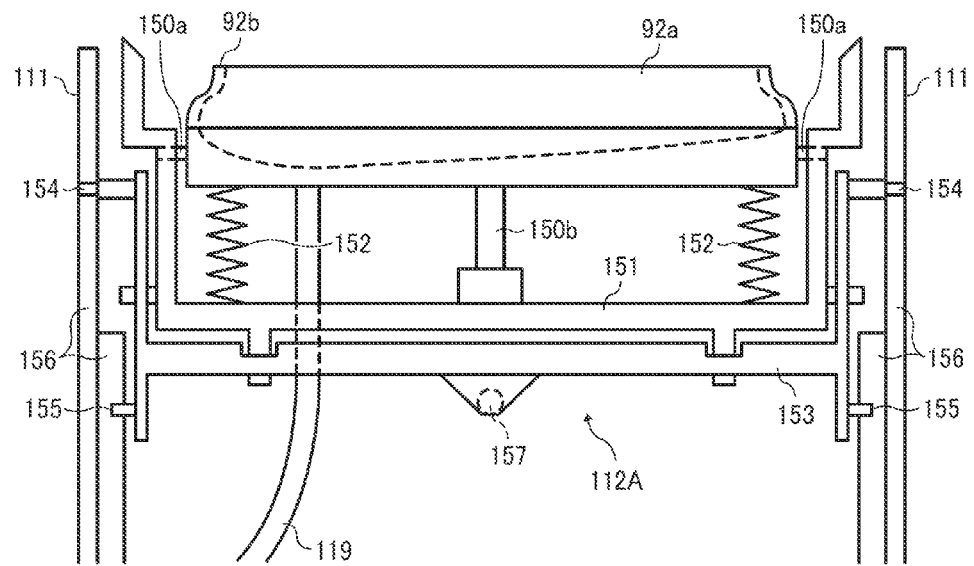
FIG. 9 is a schematic view illustrating a side of holding and elevating mechanism of a cap.

FIG. 9 is a schematic view illustrating a side of ding and elevating mechanism of the cap 92.

A cap holder 112A holding a cap has a holder 151 elevatably holding the caps 92a and 92h (92A), a spring 152 located between a bottom surface of the holder 151 and a bottom of the cap 92A, biasing the cap 92A upward, and a slider 153 slidably holding the holder 151 back and forth (line direction of the nozzles of the recording head 34).

The cap 92A is equipped with guide pins 150a at both ends elevatable through an unillustrated guide trough of the holder 151 and a guide shaft 150b at the bottom surface elevatably on the holder 151. A spring 152 located between the cap 92A and the cap holder 151 biases the caps 92a and 92b upward (a direction of pressing the caps 92a and 92b to the nozzle surfaces when capped).

The slider 153 slidably engages the guide pins 154 and 155 with a guide trough 156 formed on the frame 111 such that the slider 153, the holder 151 and the cap 92A are all elevatable. A cans pin 157 located below the slider 153 is engaged with an unillustrated cam through to elevate the slider 153, the holder 151 and the cap 92A by rotation of the cap cam 122A rotating with the cam shaft 121 rotation of the motor 131 is transmitted to. Further, the slider 153 and the holder 151 are inserted into the suction cap 92a, a tube 119 is wired thereon in its short direction from the lower part of the central position o the cap.

A cap holder 112B holding the caps 92c and 92d (cap 92B) and a method of elevating this are same as above. However, the tube 119 is not connected to the caps 92c and 92d. The motor 131 is driven to rotate the cam shaft 121, and the cam shaft 121 rotates to rotate the cams 122A and 122B fixed thereon such that the caps 92A and 92B elevate.

The inkjet recorder and the inkjet recording method of the present invention are used for various inkjet recordings such as inkjet recording printers, facsimiles, copiers and their combination machines.

The recorded matter of the present invention has an image recorded by the inkjet ink of the present invention on a recording medium and has high-quality images and good stability preferably usable for various applications.

The recording media are not particularly limited, as long as the inkjet recording ink of the present invention lands thereon to form an image thereon. Specific examples thereof include plain papers, coated papers for printing, glossy papers, special papers, etc. They include calcium carbonate, talc, kaolin or aluminum sulfate, etc., and divalent or trivalent ions such as calcium, magnesium and aluminum elute when the inkjet recording ink of the present invention lands thereon. Namely, the ink of the present invention reacts with the metallic ions to agglutinate a pigment and produces images having high image density.

Most of loading materials and size fixers included in the plain papers are metallic salts having poor water solubility. Even when a water-soluble metallic salt is included, the content there of is low. Therefore, the plain papers do not improve in image density so much as papers including water-soluble multivalent metallic salts.

However, the inkjet recording ink of the present invention reacts with a pigment to produce images having high image density even when the multivalent metallic ions elute less.

Specific examples of the marketed plain papers include quality paper My Paper from Ricoh Company, Ltd., Xerox 4024 from Fuji Xerox Co, Ltd., etc.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Synthesis Example 1

Synthesis of Copolymer 1

In a reaction container including a gas inlet tube, a thermometer and a reflux condenser, in an argon atmosphere, 240 parts of methyl ethyl ketone, 13.4 parts of 2-methacryloxyethylacid phosphate phosmer M from Uni-Chemical Co., Ltd., 26.6 parts of n-stearylmethacrylate and 0.6 parts of 1-dodecanthiol as a molecular weight adjuster were placed to prepare a solution, and argon gas displacement was performed for 30 min while the solution was stirred to prepare a mixed solution. In an argon atmosphere, the mixed solution was heated to have a temperature of 60° C. while stirred, and a solution including a half of 1.2 parts of a polymerization initiator 2,2'-azobis(2,4-dimethylvaleronitrile) (AIBN) and methyl ethyl ketone was dripped therein with a dripping funnel. After dripped, the temperature of the mixed liquid was maintained at 60° C. for 3 hrs (first reaction). Then, the remaining solution of the polymerization initiator was dripped and reacted at 60° C. for 7 hrs (second reaction) to prepare a copolymer solution.

The copolymer solution was placed in a large amount of acetone to precipitate the copolymer and a solvent was removed therefrom by decantation. Further, the precipitated product was dried to prepare a copolymer including a phosphonic acid group.

The copolymer was dissolved in ethanol to prepare a solution, and potassium hydroxide dissolved in methanol was added and mixed therein so as to be completely disacidified. After the mixture was stirred, a solvent was removed by an evaporator, and further dried in a vacuum to prepare a copolymer 1 having a neutralized phosphonic acid group.

Synthesis Examples 2 to 25

Synthesis of Copolymers 2 to 25

The procedure for preparation of the copolymer in Synthesis Example 1 was repeated except for using monomers (1) and (2), and changing an amount of the polymerization initiator and conditions of the first and second reactions as shown in Table 1. Solvents used were all methyl ethyl ketone. Potassium hydroxide was used to neutralize the copolymers.

Phosmer PE is acid phosphoxy polyoxyethylene glycol methacrylate from Uni-Chemical Co., Ltd., and vinyl phosphonic acid is from Tokyo Chemical Industry Co., Ltd.

Weight-average molecular weights of the copolymers 1 to 15 were measured as follows. The results are shown in Tables 1-1 to 1-5.

GPC method was used with a column constant temperature reservoir CTO-20A from Shimadzu Corp., a detector RID-10A from Shimadzu Corp., an eluent duct pump LC-20AD from Shimadzu Corp., a degasser DGU-20A from Shimadzu Corp., and an auto-sampler SIL-20A from Shimadzu Corp. Aqueous SEC columns TSKgel3000PWXL (elimination limit molecular weight $2\times10^5$), TSKgel5000PWXL (elimination limit molecular weight $2.5\times10^6$) and TSKgel6000PWXL (elimination limit molecular weight $5\times10^7$) from Tosoh Corp. were connected with each other to form the column. A sample was placed in an eluent to have a concentration of 2 g/100 mL. An aqueous solution including an acetic acid and sodium acetate having 0.5 mol/litter, respectively was used as the eluent. The column had a temperature of 40° C. and a flow velocity was 1.0 mL/min. As standard samples, 9 polyethylene glycols having molecular weights of 1065, 5050, 24000, 50000, 107000, 140000, 250000, 540000 and 920000, respectively were used to determine a calibration curve. Based on the calibration curve, a weight-average molecular weight of the copolymer was measured.

TABLE 1-1

|  |  | Monomer (1) | Parts by weight |
|---|---|---|---|
| Synthesis Example 1 | Copolymer 1 | Phosmer M | 13.4 |
| Synthesis Example 2 | Copolymer 2 | Phosmer M | 33.3 |
| Synthesis Example 3 | Copolymer 3 | Phosmer PE | 3.2 |
| Synthesis Example 4 | Copolymer 4 | Phosmer M | 3.2 |
| Synthesis Example 5 | Copolymer 5 | Phosmer M | 3.2 |
| Synthesis Example 6 | Copolymer 6 | Vinyl phosphonic acid | 3.2 |
| Synthesis Example 7 | Copolymer 7 | Phosmer M | 6.6 |
| Synthesis Example 8 | Copolymer 8 | Phosmer M | 3.2 |
| Synthesis Example 9 | Copolymer 9 | Phosmer M | 6.6 |
| Synthesis Example 10 | Copolymer 10 | Phosmer M | 36.0 |
| Synthesis Example 11 | Copolymer 11 | Phosmer M | 37.0 |
| Synthesis Example 12 | Copolymer 12 | Phosmer M | 36.0 |
| Synthesis Example 13 | Copolymer 13 | Phosmer M | 36.0 |
| Synthesis Example 14 | Copolymer 14 | Phosmer M | 37.0 |
| Synthesis Example 15 | Copolymer 15 | Phosmer M | 36.0 |
| Synthesis Example 16 | Copolymer 16 | Phosmer M | 6.6 |
| Synthesis Example 17 | Copolymer 17 | Phosmer M | 3.0 |
| Synthesis Example 18 | Copolymer 18 | Phosmer M | 6.6 |
| Synthesis Example 19 | Copolymer 19 | Phosmer M | 3.4 |
| Synthesis Example 20 | Copolymer 20 | Phosmer M | 37.2 |
| Synthesis Example 21 | Copolymer 21 | Acrylic acid | 13.4 |
| Synthesis Example 22 | Copolymer 22 | Phosmer M | 13.4 |
| Synthesis Example 23 | Copolymer 23 | Acrylic acid | 13.4 |
| Synthesis Example 24 | Copolymer 24 | Phosmer M | 13.4 |
| Synthesis Example 25 | Copolymer 25 | Phosmer M | 13.4 |

TABLE 1-2

|  |  | Monomer (2)<br>( ) is the number of carbon atoms of alkyl group | Parts by weight | (1)/(2) ratio |
|---|---|---|---|---|
| Synthesis Example 1 | Copolymer 1 | n-stearylmethacrylate(C18) | 26.6 | 0.50 |
| Synthesis Example 2 | Copolymer 2 | n-stearylmethacrylate(C18) | 6.7 | 4.97 |
| Synthesis Example 3 | Copolymer 3 | n-stearylmethacrylate(C18) | 36.8 | 0.09 |
| Synthesis Example 4 | Copolymer 4 | n-dodecylmethacrylate(C12) | 36.8 | 0.09 |
| Synthesis Example 5 | Copolymer 5 | n-docosylmethacrylate(C22) | 36.8 | 0.09 |
| Synthesis Example 6 | Copolymer 6 | n-stearylmethacrylate(C18) | 36.8 | 0.09 |
| Synthesis Example 7 | Copolymer 7 | n-stearylmethacrylate(C18) | 33.4 | 0.20 |
| Synthesis Example 8 | Copolymer 8 | n-stearylmethacrylate(C18) | 36.8 | 0.09 |
| Synthesis Example 9 | Copolymer 9 | n-stearylmethacrylate(C18) | 33.4 | 0.20 |
| Synthesis Example 10 | Copolymer 10 | n-stearylmethacrylate(C18) | 4.0 | 9 |
| Synthesis Example 11 | Copolymer 11 | n-stearylmethacrylate(C18) | 3.0 | 12 |

TABLE 1-2-continued

|  |  | Monomer (2) ( ) is the number of carbon atoms of alkyl group | Parts by weight | (1)/(2) ratio |
|---|---|---|---|---|
| Synthesis Example 12 | Copolymer 12 | n-stearylmethacrylate(C18) | 4.0 | 9 |
| Synthesis Example 13 | Copolymer 13 | n-stearylmethacrylate(C18) | 4.0 | 9 |
| Synthesis Example 14 | Copolymer 14 | n-stearylmethacrylate(C18) | 3.0 | 12 |
| Synthesis Example 15 | Copolymer 15 | n-stearylmethacrylate(C18) | 4.0 | 9 |
| Synthesis Example 16 | Copolymer 16 | n-stearylmethacrylate(C18) | 33.4 | 0.20 |
| Synthesis Example 17 | Copolymer 17 | n-stearylmethacrylate(C18) | 37.0 | 0.08 |
| Synthesis Example 18 | Copolymer 18 | n-stearylmethacrylate(C18) | 33.4 | 0.20 |
| Synthesis Example 19 | Copolymer 19 | n-stearylmethacrylate(C18) | 36.6 | 0.09 |
| Synthesis Example 20 | Copolymer 20 | n-stearylmethacrylate(C18) | 2.8 | 13 |
| Synthesis Example 21 | Copolymer 21 | n-stearylmethacrylate(C18) | 26.6 | 0.50 |
| Synthesis Example 22 | Copolymer 22 | Styrene | 26.6 | 0.50 |
| Synthesis Example 23 | Copolymer 23 | Styrene | 26.6 | 0.50 |
| Synthesis Example 24 | Copolymer 24 | Isodecylmethacrylate(C10) | 26.6 | 0.50 |
| Synthesis Example 25 | Copolymer 25 | Tetracosylmethacrylate(C23) | 26.6 | 0.50 |

TABLE 1-3

|  |  | Polymerization initiator | Parts by weight |
|---|---|---|---|
| Synthesis Example 1 | Copolymer 1 | AIBN | 1.2 |
| Synthesis Example 2 | Copolymer 2 | AIBN | 1.2 |
| Synthesis Example 3 | Copolymer 3 | AIBN | 1.3 |
| Synthesis Example 4 | Copolymer 4 | AIBN | 1.3 |
| Synthesis Example 5 | Copolymer 5 | AIBN | 1.3 |
| Synthesis Example 6 | Copolymer 6 | AIBN | 1.3 |
| Synthesis Example 7 | Copolymer 7 | AIBN | 1.3 |
| Synthesis Example 8 | Copolymer 8 | AIBN | 1.3 |
| Synthesis Example 9 | Copolymer 9 | AIBN | 1.3 |
| Synthesis Example 10 | Copolymer 10 | AIBN | 1.3 |
| Synthesis Example 11 | Copolymer 11 | AIBN | 1.3 |
| Synthesis Example 12 | Copolymer 12 | AIBN | 1.3 |
| Synthesis Example 13 | Copolymer 13 | AIBN | 1.0 |
| Synthesis Example 14 | Copolymer 14 | AIBN | 1.3 |
| Synthesis Example 15 | Copolymer 15 | AIBN | 1.3 |
| Synthesis Example 16 | Copolymer 16 | AIBN | 1.0 |
| Synthesis Example 17 | Copolymer 17 | AIBN | 1.3 |
| Synthesis Example 18 | Copolymer 18 | AIBN | 1.3 |
| Synthesis Example 19 | Copolymer 19 | AIBN | 1.3 |
| Synthesis Example 20 | Copolymer 20 | AIBN | 1.0 |
| Synthesis Example 21 | Copolymer 21 | AIBN | 1.3 |
| Synthesis Example 22 | Copolymer 22 | AIBN | 1.3 |
| Synthesis Example 23 | Copolymer 23 | AIBN | 1.3 |
| Synthesis Example 24 | Copolymer 24 | AIBN | 1.3 |
| Synthesis Example 25 | Copolymer 25 | AIBN | 1.3 |

TABLE 1-4

|  |  | First Reaction | | Second Reaction | |
|---|---|---|---|---|---|
|  |  | Temp. °C. | Time hr | Temp. °C. | Time hr |
| Synthesis Example 1 | Copolymer 1 | 60 | 3 | 60 | 7 |
| Synthesis Example 2 | Copolymer 2 | 60 | 5 | 60 | 9 |
| Synthesis Example 3 | Copolymer 3 | 80 | 1 | 80 | 2 |
| Synthesis Example 4 | Copolymer 4 | 80 | 1 | 80 | 2 |
| Synthesis Example 5 | Copolymer 5 | 80 | 1 | 80 | 2 |
| Synthesis Example 6 | Copolymer 6 | 80 | 1 | 80 | 2 |
| Synthesis Example 7 | Copolymer 7 | 80 | 1 | 80 | 2 |
| Synthesis Example 8 | Copolymer 8 | 65 | 2 | 65 | 3 |
| Synthesis Example 9 | Copolymer 9 | 65 | 2 | 65 | 3 |
| Synthesis Example 10 | Copolymer 10 | 80 | 1 | 80 | 2 |
| Synthesis Example 11 | Copolymer 11 | 65 | 3 | 65 | 7 |
| Synthesis Example 12 | Copolymer 12 | 65 | 2 | 65 | 3 |
| Synthesis Example 13 | Copolymer 13 | 50 | 16 | 50 | 32 |
| Synthesis Example 14 | Copolymer 14 | 50 | 8 | 50 | 16 |
| Synthesis Example 15 | Copolymer 15 | 50 | 8 | 50 | 16 |
| Synthesis Example 16 | Copolymer 16 | 50 | 16 | 50 | 32 |
| Synthesis Example 17 | Copolymer 17 | 50 | 8 | 50 | 16 |
| Synthesis Example 18 | Copolymer 18 | 50 | 8 | 50 | 16 |
| Synthesis Example 19 | Copolymer 19 | 80 | 1 | 80 | 2 |
| Synthesis Example 20 | Copolymer 20 | 50 | 16 | 50 | 32 |
| Synthesis Example 21 | Copolymer 21 | 65 | 3 | 65 | 7 |
| Synthesis Example 22 | Copolymer 22 | 65 | 3 | 65 | 7 |
| Synthesis Example 23 | Copolymer 23 | 65 | 5 | 65 | 10 |
| Synthesis Example 24 | Copolymer 24 | 50 | 7 | 50 | 13 |
| Synthesis Example 25 | Copolymer 25 | 50 | 8 | 50 | 16 |

TABLE 1-5

|  |  | Weight-average molecular weight |
|---|---|---|
| Synthesis Example 1 | Copolymer 1 | 13000 |
| Synthesis Example 2 | Copolymer 2 | 23000 |
| Synthesis Example 3 | Copolymer 3 | 4000 |
| Synthesis Example 4 | Copolymer 4 | 4000 |
| Synthesis Example 5 | Copolymer 5 | 4500 |
| Synthesis Example 6 | Copolymer 6 | 4000 |
| Synthesis Example 7 | Copolymer 7 | 4000 |
| Synthesis Example 8 | Copolymer 8 | 6000 |
| Synthesis Example 9 | Copolymer 9 | 6000 |
| Synthesis Example 10 | Copolymer 10 | 4000 |
| Synthesis Example 11 | Copolymer 11 | 6000 |
| Synthesis Example 12 | Copolymer 12 | 6000 |
| Synthesis Example 13 | Copolymer 13 | 53000 |
| Synthesis Example 14 | Copolymer 14 | 45000 |
| Synthesis Example 15 | Copolymer 15 | 45000 |
| Synthesis Example 16 | Copolymer 16 | 52000 |
| Synthesis Example 17 | Copolymer 17 | 46000 |
| Synthesis Example 18 | Copolymer 18 | 45000 |
| Synthesis Example 19 | Copolymer 19 | 4600 |
| Synthesis Example 20 | Copolymer 20 | 51000 |
| Synthesis Example 21 | Copolymer 21 | 12000 |
| Synthesis Example 22 | Copolymer 22 | 13000 |
| Synthesis Example 23 | Copolymer 23 | 24000 |
| Synthesis Example 24 | Copolymer 24 | 33000 |
| Synthesis Example 25 | Copolymer 25 | 35000 |

<Preparation of Pigment Dispersion 1>

The following materials were premixed to prepare a mixed slurry (a). This was subjected to a circulation dispersion by a disc type media mill (DMR from Ashizawa Finetech Ltd.)

with 0.05 mm zirconia beads at a filling rate of 55%, a peripheral speed of 10 m/s, a liquid temperature of 10° C. for 3 min. Then, the resultant dispersion was subjected to centrifugal separation by a centrifugal separator Model 7700 from KUBOTA Corporation to separate coarse particles to prepare a pigment dispersion 1 having a pigment concentration of 16% by weight.

| | |
|---|---|
| Carbon black (NIPEX160 from Degussa AG having a BET specific surface area of 150 m²/g, an average primary particle diameter of 20 nm a pH of 4.0 and a DBP oil absorption of 620 g/100 g | 160 |
| Copolymer 1 including a salt of a phosphonic acid group | 40 |
| High-purity water | 800 |

<Preparation of Pigment Dispersions 2 to 31>

The procedure for preparation of the pigment dispersion 1 was repeated except for replacing the copolymer and the pigment as shown in Tables 2-1 to 2-5. Pigment Blue 15:3 is CHROMOFINE BLUE A-220JC from (DAINICHISEIKA), Pigment Red 122 is Toner Magenta EO02 (Clariant), and Pigment Yellow 74 is Fast Yellow 531 (DAINICHISEIKCA).

TABLE 2-1

| | Pigment Dispersion | | | | | | |
|---|---|---|---|---|---|---|---|
| | 1 | 2 | 3 | 4 | 5 | 6 | 7 |
| Copolymer 1 | 40 | 40 | 40 | 40 | | | |
| Copolymer 2 | | | | | 40 | | |
| Copolymer 3 | | | | | | 40 | |
| Copolymer 4 | | | | | | | 40 |
| Copolymer 5 | | | | | | | |
| Copolymer 6 | | | | | | | |
| Copolymer 7 | | | | | | | |
| Copolymer 8 | | | | | | | |
| Copolymer 9 | | | | | | | |
| Copolymer 10 | | | | | | | |
| Copolymer 11 | | | | | | | |
| Copolymer 12 | | | | | | | |
| Copolymer 13 | | | | | | | |
| Copolymer 14 | | | | | | | |
| Copolymer 15 | | | | | | | |
| Copolymer 16 | | | | | | | |
| Copolymer 17 | | | | | | | |
| Copolymer 18 | | | | | | | |
| Copolymer 19 | | | | | | | |
| Copolymer 20 | | | | | | | |
| Copolymer 21 | | | | | | | |
| Copolymer 22 | | | | | | | |
| Copolymer 23 | | | | | | | |
| Copolymer 24 | | | | | | | |
| Copolymer 25 | | | | | | | |
| Carbon black | 160 | | | | 160 | 160 | 160 |
| Pigment Blue 15:3 | | 160 | | | | | |
| Pigment Red 122 | | | 160 | | | | |
| Pigment Yellow 74 | | | | 160 | | | |
| High-purity water | Balance | Balance | Balance | Balance | Balance | Balance | Balance |
| Total | 1000 | 1000 | 1000 | 1000 | 1000 | 1000 | 1000 |

TABLE 2-2

| | Pigment Dispersion | | | | | | |
|---|---|---|---|---|---|---|---|
| | 8 | 9 | 10 | 11 | 12 | 13 | 14 |
| Copolymer 1 | | | | | | | |
| Copolymer 2 | | | | | | | |
| Copolymer 3 | | | | | | | |
| Copolymer 4 | | | | | | | |
| Copolymer 5 | 40 | | | | | | |
| Copolymer 6 | | 40 | | | | | |
| Copolymer 7 | | | 40 | | | | |
| Copolymer 8 | | | | 40 | | | |
| Copolymer 9 | | | | | 40 | | |
| Copolymer 10 | | | | | | 40 | |
| Copolymer 11 | | | | | | | 40 |
| Copolymer 12 | | | | | | | |
| Copolymer 13 | | | | | | | |
| Copolymer 14 | | | | | | | |
| Copolymer 15 | | | | | | | |
| Copolymer 16 | | | | | | | |
| Copolymer 17 | | | | | | | |

TABLE 2-2-continued

| | Pigment Dispersion | | | | | | |
|---|---|---|---|---|---|---|---|
| | 8 | 9 | 10 | 11 | 12 | 13 | 14 |
| Copolymer 18 | | | | | | | |
| Copolymer 19 | | | | | | | |
| Copolymer 20 | | | | | | | |
| Copolymer 21 | | | | | | | |
| Copolymer 22 | | | | | | | |
| Copolymer 23 | | | | | | | |
| Copolymer 24 | | | | | | | |
| Copolymer 25 | | | | | | | |
| Carbon black | 160 | 160 | 160 | 160 | 160 | 160 | 160 |
| Pigment Blue 15:3 | | | | | | | |
| Pigment Red 122 | | | | | | | |
| Pigment Yellow 74 | | | | | | | |
| High-purity water | Balance | Balance | Balance | Balance | Balance | Balance | Balance |
| Total | 1000 | 1000 | 1000 | 1000 | 1000 | 1000 | 1000 |

TABLE 2-3

| | Pigment Dispersion | | | | | | |
|---|---|---|---|---|---|---|---|
| | 15 | 16 | 17 | 18 | 19 | 20 | 21 |
| Copolymer 1 | | | | | | | |
| Copolymer 2 | | | | | | | |
| Copolymer 3 | | | | | | | |
| Copolymer 4 | | | | | | | |
| Copolymer 5 | | | | | | | |
| Copolymer 6 | | | | | | | |
| Copolymer 7 | | | | | | | |
| Copolymer 8 | | | | | | | |
| Copolymer 9 | | | | | | | |
| Copolymer 10 | | | | | | | |
| Copolymer 11 | 40 | | | | | | |
| Copolymer 12 | | 40 | | | | | |
| Copolymer 13 | | | 40 | | | | |
| Copolymer 14 | | | | 40 | | | |
| Copolymer 15 | | | | | 40 | | |
| Copolymer 16 | | | | | | 40 | |
| Copolymer 17 | | | | | | | 40 |
| Copolymer 18 | | | | | | | |
| Copolymer 19 | | | | | | | |
| Copolymer 20 | | | | | | | |
| Copolymer 21 | | | | | | | |
| Copolymer 22 | | | | | | | |
| Copolymer 23 | | | | | | | |
| Copolymer 24 | | | | | | | |
| Copolymer 25 | | | | | | | |
| Carbon black | 160 | 160 | 160 | 160 | 160 | 160 | 160 |
| Pigment Blue 15:3 | | | | | | | |
| Pigment Red 122 | | | | | | | |
| Pigment Yellow 74 | | | | | | | |
| High-purity water | Balance | Balance | Balance | Balance | Balance | Balance | Balance |
| Total | 1000 | 1000 | 1000 | 1000 | 1000 | 1000 | 1000 |

TABLE 2-4

| | Pigment Dispersion | | | | | | |
|---|---|---|---|---|---|---|---|
| | 22 | 23 | 24 | 25 | 26 | 27 | 28 |
| Copolymer 1 | | | | | | | |
| Copolymer 2 | | | | | | | |
| Copolymer 3 | | | | | | | |
| Copolymer 4 | | | | | | | |
| Copolymer 5 | | | | | | | |
| Copolymer 6 | | | | | | | |
| Copolymer 7 | | | | | | | |
| Copolymer 8 | | | | | | | |
| Copolymer 9 | | | | | | | |
| Copolymer 10 | | | | | | | |

TABLE 2-4-continued

|  | Pigment Dispersion | | | | | | |
|---|---|---|---|---|---|---|---|
|  | 22 | 23 | 24 | 25 | 26 | 27 | 28 |
| Copolymer 11 | | | | | | | |
| Copolymer 12 | | | | | | | |
| Copolymer 13 | | | | | | | |
| Copolymer 14 | | | | | | | |
| Copolymer 15 | | | | | | | |
| Copolymer 16 | | | | | | | |
| Copolymer 17 | | | | | | | |
| Copolymer 18 | | | | | | | |
| Copolymer 19 | 40 | | | | | | |
| Copolymer 20 | | 40 | | | | | |
| Copolymer 21 | | | 40 | | | | |
| Copolymer 22 | | | | 40 | | | |
| Copolymer 23 | | | | | 40 | 40 | 40 |
| Copolymer 24 | | | | | | | |
| Copolymer 25 | | | | | | | |
| Carbon black | 160 | 160 | 160 | 160 | 160 | | |
| Pigment Blue 15:3 | | | | | | 160 | |
| Pigment Red 122 | | | | | | | 160 |
| Pigment Yellow 74 | | | | | | | |
| High-purity water | Balance | Balance | Balance | Balance | Balance | Balance | Balance |
| Total | 1000 | 1000 | 1000 | 1000 | 1000 | 1000 | 1000 |

TABLE 2-5

|  | Pigment Dispersion | | |
|---|---|---|---|
|  | 29 | 30 | 31 |
| Copolymer 1 | | | |
| Copolymer 2 | | | |
| Copolymer 3 | | | |
| Copolymer 4 | | | |
| Copolymer 5 | | | |
| Copolymer 6 | | | |
| Copolymer 7 | | | |
| Copolymer 8 | | | |
| Copolymer 9 | | | |
| Copolymer 10 | | | |
| Copolymer 11 | | | |
| Copolymer 12 | | | |
| Copolymer 13 | | | |
| Copolymer 14 | | | |
| Copolymer 15 | | | |
| Copolymer 16 | | | |
| Copolymer 17 | | | |
| Copolymer 18 | | | |
| Copolymer 19 | | | |
| Copolymer 20 | | | |
| Copolymer 21 | | | |
| Copolymer 22 | | | |
| Copolymer 23 | 40 | | |
| Copolymer 24 | | 40 | |
| Copolymer 25 | | | 40 |
| Carbon black | | 160 | 160 |
| Pigment Blue 15:3 | | | |
| Pigment Red 122 | | | |
| Pigment Yellow 74 | 160 | | |
| High-purity water | Balance | Balance | Balance |
| Total | 1000 | 1000 | 1000 |

Example 1

The following materials were mixed and stirred for 1 hr. The resultant dispersion was subjected to pressure filtration by a polyvinylidenefluoride membrane filter having an average pore diameter of 5.0 μm to remove coarse particles and dusts. Thus, an ink was prepared.

| | |
|---|---|
| Pigment dispersion 1 (pigment concentration 16%) | 50 |
| Glycerin | 10 |
| 1,3-butanediol | 20 |
| High-purity water | 20 |

Examples 2 to 24 and Comparative Examples 1 to 8

The procedure for preparation of the ink in example 1 was repeated except for replacing the pigment dispersion and the water-soluble organic solvent as shown in Tables 3-1 to 3-7.

TABLE 3-1

|  |  | Example | | | | |
|---|---|---|---|---|---|---|
|  |  | 1 | 2 | 3 | 4 | 5 |
| Pigment Dispersion | Pigment dispersion 1 | 50 | | 50 | | |
| | Pigment dispersion 2 | | 50 | | | |
| | Pigment dispersion 3 | | | | 30 | |
| | Pigment dispersion 4 | | | | | 50 |
| | Pigment dispersion 5 | | | | | |

TABLE 3-1-continued

|  |  | Example | | | | |
|---|---|---|---|---|---|---|
|  |  | 1 | 2 | 3 | 4 | 5 |
| | Pigment dispersion 6 | | | | | |
| | Pigment dispersion 7 | | | | | |
| | Pigment dispersion 8 | | | | | |
| | Pigment dispersion 9 | | | | | |
| | Pigment dispersion 10 | | | | | |
| | Pigment dispersion 11 | | | | | |
| | Pigment dispersion 12 | | | | | |
| | Pigment dispersion 13 | | | | | |
| | Pigment dispersion 14 | | | | | |
| | Pigment dispersion 15 | | | | | |
| | Pigment dispersion 16 | | | | | |
| | Pigment dispersion 17 | | | | | |
| | Pigment dispersion 18 | | | | | |
| | Pigment dispersion 19 | | | | | |
| | Pigment dispersion 20 | | | | | |
| | Pigment dispersion 21 | | | | | |
| | Pigment dispersion 22 | | | | | |
| | Pigment dispersion 23 | | | | | |
| | Pigment dispersion 24 | | | | | |
| | Pigment dispersion 25 | | | | | |
| | Pigment dispersion 26 | | | | | |
| | Pigment dispersion 27 | | | | | |
| | Pigment dispersion 28 | | | | | |
| | Pigment dispersion 29 | | | | | |
| | Pigment dispersion 30 | | | | | |
| | Pigment dispersion 31 | | | | | |
| Water-soluble solvent | Glycerin | 10 | 10 | | 10 | 10 |
| | 1,3-butanediol | 20 | 20 | | 20 | 20 |
| | Trimethylol propane | | | 15 | | |
| | 2-pyrrolidone | | | 15 | | |
| Solvent | High-purity water | Balance | Balance | Balance | Balance | Balance |
| | Total | 100 | 100 | 100 | 100 | 100 |

TABLE 3-2

|  |  | Example | | | | |
|---|---|---|---|---|---|---|
|  |  | 6 | 7 | 8 | 9 | 10 |
| Pigment Dispersion | Pigment dispersion 1 | | | | | |
| | Pigment dispersion 2 | | | | | |
| | Pigment dispersion 3 | | | | | |
| | Pigment dispersion 4 | | | | | |
| | Pigment dispersion 5 | 30 | | | | |
| | Pigment dispersion 6 | | 50 | | | |
| | Pigment dispersion 7 | | | 50 | | |
| | Pigment dispersion 8 | | | | 50 | |
| | Pigment dispersion 9 | | | | | 50 |
| | Pigment dispersion 10 | | | | | |
| | Pigment dispersion 11 | | | | | |
| | Pigment dispersion 12 | | | | | |
| | Pigment dispersion 13 | | | | | |
| | Pigment dispersion 14 | | | | | |
| | Pigment dispersion 15 | | | | | |
| | Pigment dispersion 16 | | | | | |
| | Pigment dispersion 17 | | | | | |
| | Pigment dispersion 18 | | | | | |
| | Pigment dispersion 19 | | | | | |
| | Pigment dispersion 20 | | | | | |
| | Pigment dispersion 21 | | | | | |
| | Pigment dispersion 22 | | | | | |
| | Pigment dispersion 23 | | | | | |
| | Pigment dispersion 24 | | | | | |
| | Pigment dispersion 25 | | | | | |
| | Pigment dispersion 26 | | | | | |
| | Pigment dispersion 27 | | | | | |
| | Pigment dispersion 28 | | | | | |
| | Pigment dispersion 29 | | | | | |
| | Pigment dispersion 30 | | | | | |
| | Pigment dispersion 31 | | | | | |

TABLE 3-2-continued

|  |  | Example | | | | |
|---|---|---|---|---|---|---|
|  |  | 6 | 7 | 8 | 9 | 10 |
| Water-soluble solvent | Glycerin | 10 | 10 | 10 | 10 | 10 |
|  | 1,3-butanediol | 20 | 20 | 20 | 20 | 20 |
|  | Trimethylol propane |  |  |  |  |  |
|  | 2-pyrrolidone |  |  |  |  |  |
| Solvent | High-purity water | Balance | Balance | Balance | Balance | Balance |
|  | Total | 100 | 100 | 100 | 100 | 100 |

TABLE 3-3

|  |  | Example | | | | |
|---|---|---|---|---|---|---|
|  |  | 11 | 12 | 13 | 14 | 15 |
| Pigment Dispersion | Pigment dispersion 1 |  |  |  |  |  |
|  | Pigment dispersion 2 |  |  |  |  |  |
|  | Pigment dispersion 3 |  |  |  |  |  |
|  | Pigment dispersion 4 |  |  |  |  |  |
|  | Pigment dispersion 5 |  |  |  |  |  |
|  | Pigment dispersion 6 |  |  |  |  |  |
|  | Pigment dispersion 7 |  |  |  |  |  |
|  | Pigment dispersion 8 |  |  |  |  |  |
|  | Pigment dispersion 9 |  |  |  |  |  |
|  | Pigment dispersion 10 | 50 |  |  |  |  |
|  | Pigment dispersion 11 |  | 50 |  |  |  |
|  | Pigment dispersion 12 |  |  | 50 |  |  |
|  | Pigment dispersion 13 |  |  |  | 50 |  |
|  | Pigment dispersion 14 |  |  |  |  | 50 |
|  | Pigment dispersion 15 |  |  |  |  |  |
|  | Pigment dispersion 16 |  |  |  |  |  |
|  | Pigment dispersion 17 |  |  |  |  |  |
|  | Pigment dispersion 18 |  |  |  |  |  |
|  | Pigment dispersion 19 |  |  |  |  |  |
|  | Pigment dispersion 20 |  |  |  |  |  |
|  | Pigment dispersion 21 |  |  |  |  |  |
|  | Pigment dispersion 22 |  |  |  |  |  |
|  | Pigment dispersion 23 |  |  |  |  |  |
|  | Pigment dispersion 24 |  |  |  |  |  |
|  | Pigment dispersion 25 |  |  |  |  |  |
|  | Pigment dispersion 26 |  |  |  |  |  |
|  | Pigment dispersion 27 |  |  |  |  |  |
|  | Pigment dispersion 28 |  |  |  |  |  |
|  | Pigment dispersion 29 |  |  |  |  |  |
|  | Pigment dispersion 30 |  |  |  |  |  |
|  | Pigment dispersion 31 |  |  |  |  |  |
| Water-soluble solvent | Glycerin | 10 | 10 | 10 | 10 | 10 |
|  | 1,3-butanediol | 20 | 20 | 20 | 20 | 20 |
|  | Trimethylol propane |  |  |  |  |  |
|  | 2-pyrrolidone |  |  |  |  |  |
| Solvent | High-purity water | Balance | Balance | Balance | Balance | Balance |
|  | Total | 100 | 100 | 100 | 100 | 100 |

TABLE 3-4

|  |  | Example | | | | |
|---|---|---|---|---|---|---|
|  |  | 16 | 17 | 18 | 19 | 20 |
| Pigment Dispersion | Pigment dispersion 1 |  |  |  |  |  |
|  | Pigment dispersion 2 |  |  |  |  |  |
|  | Pigment dispersion 3 |  |  |  |  |  |
|  | Pigment dispersion 4 |  |  |  |  |  |
|  | Pigment dispersion 5 |  |  |  |  |  |
|  | Pigment dispersion 6 |  |  |  |  |  |
|  | Pigment dispersion 7 |  |  |  |  |  |
|  | Pigment dispersion 8 |  |  |  |  |  |
|  | Pigment dispersion 9 |  |  |  |  |  |
|  | Pigment dispersion 10 |  |  |  |  |  |
|  | Pigment dispersion 11 |  |  |  |  |  |
|  | Pigment dispersion 12 |  |  |  |  |  |

TABLE 3-4-continued

| | | Example | | | | |
|---|---|---|---|---|---|---|
| | | 16 | 17 | 18 | 19 | 20 |
| | Pigment dispersion 13 | | | | | |
| | Pigment dispersion 14 | | | | | |
| | Pigment dispersion 15 | 50 | | | | |
| | Pigment dispersion 16 | | 50 | | | |
| | Pigment dispersion 17 | | | 50 | | |
| | Pigment dispersion 18 | | | | 50 | |
| | Pigment dispersion 19 | | | | | 50 |
| | Pigment dispersion 20 | | | | | |
| | Pigment dispersion 21 | | | | | |
| | Pigment dispersion 22 | | | | | |
| | Pigment dispersion 23 | | | | | |
| | Pigment dispersion 24 | | | | | |
| | Pigment dispersion 25 | | | | | |
| | Pigment dispersion 26 | | | | | |
| | Pigment dispersion 27 | | | | | |
| | Pigment dispersion 28 | | | | | |
| | Pigment dispersion 29 | | | | | |
| | Pigment dispersion 30 | | | | | |
| | Pigment dispersion 31 | | | | | |
| Water-soluble solvent | Glycerin | 10 | 10 | 10 | 10 | 10 |
| | 1,3-butanediol | 20 | 20 | 20 | 20 | 20 |
| | Trimethylol propane | | | | | |
| | 2-pyrrolidone | | | | | |
| Solvent | High-purity water | Balance | Balance | Balance | Balance | Balance |
| | Total | 100 | 100 | 100 | 100 | 100 |

TABLE 3-5

| | | Example | | | |
|---|---|---|---|---|---|
| | | 21 | 22 | 23 | 24 |
| Pigment Dispersion | Pigment dispersion 1 | | | | |
| | Pigment dispersion 2 | | | | |
| | Pigment dispersion 3 | | | | |
| | Pigment dispersion 4 | | | | |
| | Pigment dispersion 5 | | | | |
| | Pigment dispersion 6 | | | | |
| | Pigment dispersion 7 | | | | |
| | Pigment dispersion 8 | | | | |
| | Pigment dispersion 9 | | | | |
| | Pigment dispersion 10 | | | | |
| | Pigment dispersion 11 | | | | |
| | Pigment dispersion 12 | | | | |
| | Pigment dispersion 13 | | | | |
| | Pigment dispersion 14 | | | | |
| | Pigment dispersion 15 | | | | |
| | Pigment dispersion 16 | | | | |
| | Pigment dispersion 17 | | | | |
| | Pigment dispersion 18 | | | | |
| | Pigment dispersion 19 | | | | |
| | Pigment dispersion 20 | 50 | | | 50 |
| | Pigment dispersion 21 | | 50 | | |
| | Pigment dispersion 22 | | | 50 | |
| | Pigment dispersion 23 | | | | 50 |
| | Pigment dispersion 24 | | | | |
| | Pigment dispersion 25 | | | | |
| | Pigment dispersion 26 | | | | |
| | Pigment dispersion 27 | | | | |
| | Pigment dispersion 28 | | | | |
| | Pigment dispersion 29 | | | | |
| | Pigment dispersion 30 | | | | |
| | Pigment dispersion 31 | | | | |
| Water-soluble solvent | Glycerin | 10 | 10 | 10 | 10 |
| | 1,3-butanediol | 20 | 20 | 20 | 20 |
| | Trimethylol propane | | | | |
| | 2-pyrrolidone | | | | |
| Solvent | High-purity water | Balance | Balance | Balance | Balance |
| | Total | 100 | 100 | 100 | 100 |

TABLE 3-6

| | | Comparative Example | | | |
|---|---|---|---|---|---|
| | | 1 | 2 | 3 | 4 |
| Pigment Dispersion | Pigment dispersion 1 | | | | |
| | Pigment dispersion 2 | | | | |
| | Pigment dispersion 3 | | | | |
| | Pigment dispersion 4 | | | | |
| | Pigment dispersion 5 | | | | |
| | Pigment dispersion 6 | | | | |
| | Pigment dispersion 7 | | | | |
| | Pigment dispersion 8 | | | | |
| | Pigment dispersion 9 | | | | |
| | Pigment dispersion 10 | | | | |
| | Pigment dispersion 11 | | | | |
| | Pigment dispersion 12 | | | | |
| | Pigment dispersion 13 | | | | |
| | Pigment dispersion 14 | | | | |
| | Pigment dispersion 15 | | | | |
| | Pigment dispersion 16 | | | | |
| | Pigment dispersion 17 | | | | |
| | Pigment dispersion 18 | | | | |
| | Pigment dispersion 19 | | | | |
| | Pigment dispersion 20 | | | | |
| | Pigment dispersion 21 | | | | |
| | Pigment dispersion 22 | | | | |
| | Pigment dispersion 23 | | | | |
| | Pigment dispersion 24 | 50 | | | |
| | Pigment dispersion 25 | | 50 | | |
| | Pigment dispersion 26 | | | 50 | |
| | Pigment dispersion 27 | | | | 30 |
| | Pigment dispersion 28 | | | | |
| | Pigment dispersion 29 | | | | |
| | Pigment dispersion 30 | | | | |
| | Pigment dispersion 31 | | | | |
| Water-soluble solvent | Glycerin | 10 | 10 | 10 | 10 |
| | 1,3-butanediol | 20 | 20 | 20 | 20 |
| | Trimethylol propane | | | | |
| | 2-pyrrolidone | | | | |
| Solvent | High-purity water | Balance | Balance | Balance | Balance |
| | Total | 100 | 100 | 100 | 100 |

TABLE 3-7

| | | Comparative Example | | | |
|---|---|---|---|---|---|
| | | 5 | 6 | 7 | 8 |
| Pigment Dispersion | Pigment dispersion 1 | | | | |
| | Pigment dispersion 2 | | | | |
| | Pigment dispersion 3 | | | | |
| | Pigment dispersion 4 | | | | |
| | Pigment dispersion 5 | | | | |
| | Pigment dispersion 6 | | | | |
| | Pigment dispersion 7 | | | | |
| | Pigment dispersion 8 | | | | |
| | Pigment dispersion 9 | | | | |
| | Pigment dispersion 10 | | | | |
| | Pigment dispersion 11 | | | | |
| | Pigment dispersion 12 | | | | |
| | Pigment dispersion 13 | | | | |
| | Pigment dispersion 14 | | | | |
| | Pigment dispersion 15 | | | | |
| | Pigment dispersion 16 | | | | |
| | Pigment dispersion 17 | | | | |
| | Pigment dispersion 18 | | | | |
| | Pigment dispersion 19 | | | | |
| | Pigment dispersion 20 | | | | |
| | Pigment dispersion 21 | | | | |
| | Pigment dispersion 22 | | | | |
| | Pigment dispersion 23 | | | | |
| | Pigment dispersion 24 | | | | |
| | Pigment dispersion 25 | | | | |
| | Pigment dispersion 26 | | | | |
| | Pigment dispersion 27 | | | | |
| | Pigment dispersion 28 | 50 | | | |
| | Pigment dispersion 29 | | 30 | | |
| | Pigment dispersion 30 | | | | |
| | Pigment dispersion 31 | | | | 50 |
| Water-soluble solvent | Glycerin | 10 | 10 | 10 | 10 |
| | 1,3-butanediol | 20 | 20 | 20 | 20 |
| | Trimethylol propane 2-pyrrolidone | | | | |
| Solvent | High-purity water | Balance | Balance | Balance | Balance |
| | Total | 100 | 100 | 100 | 100 |

<Preservation Stability of Pigment Dispersion and Ink>

The viscosities of the pigment dispersions 1 to 31, and the inks of Examples 1 to 24 and Comparative Examples 1 to 8 were measured by, e.g., a viscometer RE80L from TOKI SANGYO CO., LTD. at 25° C., adjusting the rotational number such that a torque was from 40 to 80%. As an index of dispersion stability of the pigment dispersion and the pigment in the ink, the initial viscosities of the pigment dispersions and the inks were measured to evaluate under the following standard.

As for the preservability, after the initial viscosities thereof were measured, each of them were placed in a polyethylene container and sealed. The viscosity after stored at 70° C. for 1 week was measured to evaluate under the following standard, compared with the initial viscosity. The results are shown in Tables 5-1 and 5-2.

Viscosity variation(%)=[(viscosity after preserved− initial viscosity)/initial viscosity]×100

[Pigment Dispersion Evaluation Standard]
Initial Viscosity
　Excellent: less than 3 mPa·s
　Good: not less than 3 mPa·s and less than 7 mPa·s
　Poor: not less than 7 mPa·s
Preservability (Viscosity Variation)
　Excellent: less than 5%
　Good: not less than 5% less than 50%
　Poor: not less than 50%

[Ink Evaluation Standard]
Initial Viscosity
　Excellent: less than 9 Pas
　Good: not less than 9 mPa·s and less than 20 mPa·s
　Poor: not less than 20 mPa·s
Preservability (Change Rate of Viscosity after Stored)
　Good: less than 5%
　Fair: not less than 5% less than 50%
　Poor: not less than 50%
<Printed Image Evaluation>

Each printed image density the inks of Examples 1 to 24 and Comparative Examples 1 to 8 was evaluated.

A drive voltage of piezo element of an inkjet printer IPSiO GX3000 from Ricoh Company, Ltd. was changed to uniformly discharge the ink such that the same amount of the ink adheres to a recording material. The results are shown in Tables 5-1 and 5-2.

Papers used in evaluation and an amount of eluted Ca ion are shown in Table 4. Ca ion eluted from the papers was measured by the method mentioned before.

TABLE 4

| Paper | Eluted Ca ion [g/g] |
|---|---|
| My Paper from Ricoh Company, Ltd.: Plain Paper 1 | $4.3 \times 10^{-4}$ |
| Xerox 4024 from Fuji Xerox Co,, Ltd.: Plain Paper 2 | $1.7 \times 10^{-4}$ |
| Filter paper No. 5A from ADVANTEC CO., LTD. | $1.1 \times 10^{-6}$ |
| COPY PLUS from Hammermill Papers | $8.5 \times 10^{-3}$ |

<<Image Density•Bleed-Through>>

After a chart on which general marks JIS X 0208 (1997) and 2223 having 64 points are described by Microsoft Word 2003 was printed on My Paper (Plain Paper 1) and Xerox 4024 (Plain Paper 2) using the inks, the image densities of the general marks JIS X 0208 (1997) and 2223 was evaluated using X-Rite938 from X-Rite, Inc. Then, the printing mode was "plain paper-fast" mode by a driver of the printer. The general marks JIS X 0208 (1997) and 2223 has the outer form of a square and the whole surface was filled with ink.

Further, the image densities of the marks were measured by the X-Rite938 from the backside of the paper to evaluate bleed-through.

In addition, images printed on filter paper No 5A from ADVANTEC CO., LTD. and COPY PLUS from Hammermill Papers using the inks of Example 1 and Comparative Example 1 were evaluated in the same way. The results are shown in Tables 6-1 and 6-2 as Comparative Examples 9 and 10.

[Image Density Evaluation Standard]
　Excellent: Black not less than 1.20
　　Yellow not less than 0.75
　　Magenta not less than 0.90
　　Can not less than 1.00
　Good: Black not less than 1.10, less than 1.20
　　Yellow not less than 0.70, less than 0.75
　　Magenta not less than 0.80, less than 0.90
　　Cyan not less than 0.90, less than 1.00
　Fair: Black not less than 1.00, less than 1.10
　　Yellow not less than 0.65, less than 0.70
　　Magenta not less than 0.70, less than 0.80
　　Cyan not less than 0.80, less than 0.90
　Poor: Black less than 1.00
　　Yellow less than 0.65
　　Magenta less than 0.70
　　Cyan less than 0.80

[Bleed-Through Evaluation Standard]
Excellent: Black less than 0.10
Yellow less than 0.08
Magenta less than 0.09
Cyan less than 0.10
Good: Black not less than 0.10, less than 0.20
Yellow not less than 0.08, less than 0.16
Magenta not less than 0.09, less than 0.18
Cyan not less than 0.10, less than 0.20
Fair: Black not less than 0.20, less than 0.50
Yellow not less than 0.16, less than 0.40
Magenta not less than 0.18, less than 0.40
Cyan not less than 0.20, less than 0.50
Poor: Black not less than 0.50
Yellow not less than 0.40
Magenta not less than 0.40
Cyan not less than 0.50

<<Scratch Resistance>>

A chart on which general marks JIS X 0208 (1997) and 2223 having 64 points are described by Microsoft Word 2003 was printed on My Paper (Plain Paper 1) and Xerox 4024 (Plain Paper 2) using the inks. After the chart was dried at 25° C. for 10 min, the printed image was scraped with a cotton cloth to visually observe pigment transfer thereto. This was evaluated on the following standard. One part of each color (total 4 parts) on one chart was evaluated.

Good: No ink transfer onto the cotton cloth was observed, or the ink was slightly transferred thereon, but which is not a problem Poor: the ink was obviously transferred onto the cotton cloth Further, images printed on filter paper No. 5A from ADVANTEC CO., LTD. and COPY PLUS from Hammermill Papers using the inks of Example 1 and Comparative Example 1 were evaluated in the same way. The results are shown in Tables 6-1 and 6-2 as Comparative Examples 9 and 10.

TABLE 5-1

|  | Pigment Dispersion | Pigment Dispersion Viscosity | Pigment Dispersion Preservability | Ink Viscosity | Ink Preservability |
| --- | --- | --- | --- | --- | --- |
| Example 1 | Pigment dispersion 1 | Excellent | Excellent | Excellent | Excellent |
| Example 2 | Pigment dispersion 2 | Excellent | Excellent | Excellent | Excellent |
| Example 3 | Pigment dispersion 1 | Excellent | Excellent | Excellent | Excellent |
| Example 4 | Pigment dispersion 3 | Excellent | Excellent | Excellent | Excellent |
| Example 5 | Pigment dispersion 4 | Excellent | Excellent | Excellent | Excellent |
| Example 6 | Pigment dispersion 5 | Excellent | Excellent | Excellent | Excellent |
| Example 7 | Pigment dispersion 6 | Good | Excellent | Good | Good |
| Example 8 | Pigment dispersion 7 | Good | Good | Good | Excellent |
| Example 9 | Pigment dispersion 8 | Good | Good | Good | Excellent |
| Example 10 | Pigment dispersion 9 | Excellent | Excellent | Good | Excellent |
| Example 11 | Pigment dispersion 10 | Excellent | Good | Good | Good |
| Example 12 | Pigment dispersion 11 | Excellent | Excellent | Good | Good |
| Example 13 | Pigment dispersion 12 | Excellent | Excellent | Excellent | Excellent |
| Example 14 | Pigment dispersion 13 | Excellent | Good | Good | Good |
| Example 15 | Pigment dispersion 14 | Good | Good | Good | Good |
| Example 16 | Pigment dispersion 15 | Excellent | Excellent | Excellent | Excellent |
| Example 17 | Pigment dispersion 16 | Good | Good | Good | Good |
| Example 18 | Pigment dispersion 17 | Excellent | Good | Good | Good |
| Example 19 | Pigment dispersion 18 | Excellent | Excellent | Excellent | Good |
| Example 20 | Pigment dispersion 19 | Good | Good | Good | Good |
| Example 21 | Pigment dispersion 20 | Good | Good | Good | Good |
| Example 22 | Pigment dispersion 21 | Excellent | Good | Good | Excellent |
| Example 23 | Pigment dispersion 22 | Good | Good | Good | Good |
| Example 24 | Pigment dispersion 23 | Good | Good | Good | Good |
| Comparative Example 1 | Pigment dispersion 24 | Good | Good | Good | Good |
| Comparative Example 2 | Pigment dispersion 25 | Good | Good | Poor | Poor |

TABLE 5-1-continued

|  | Pigment Dispersion | Pigment Dispersion | | Ink | |
|---|---|---|---|---|---|
|  | Dispersion | Viscosity | Preservability | Viscosity | Preservability |
| Comparative Example 3 | Pigment dispersion 26 | Poor | Poor | Poor | Poor |
| Comparative Example 4 | Pigment dispersion 27 | Poor | Poor | Poor | Poor |
| Comparative Example 5 | Pigment dispersion 28 | Poor | Poor | Poor | Poor |
| Comparative Example 6 | Pigment dispersion 29 | Poor | Poor | Poor | Poor |
| Comparative Example 7 | Pigment dispersion 30 | Good | Good | Good | Poor |
| Comparative Example 8 | Pigment dispersion 31 | Poor | Poor | Good | Poor |

TABLE 5-2

|  |  | Image Density | | Bleed-through | | Scratch resistance | |
|---|---|---|---|---|---|---|---|
|  | Pigment Dispersion | Plain Paper 1 | Plain Paper 2 | Plain Paper 1 | Plain Paper 2 | Plain Paper 1 | Plain Paper 2 |
| Example 1 | Pigment dispersion 1 | Excellent | Excellent | Excellent | Good | Good | Good |
| Example 2 | Pigment dispersion 2 | Excellent | Excellent | Excellent | Excellent | Good | Good |
| Example 3 | Pigment dispersion 1 | Excellent | Excellent | Good | Good | Good | Good |
| Example 4 | Pigment dispersion 3 | Excellent | Excellent | Good | Excellent | Good | Good |
| Example 5 | Pigment dispersion 4 | Excellent | Excellent | Excellent | Good | Good | Good |
| Example 6 | Pigment dispersion 5 | Excellent | Excellent | Excellent | Good | Good | Good |
| Example 7 | Pigment dispersion 6 | Good | Excellent | Good | Good | Good | Good |
| Example 8 | Pigment dispersion 7 | Excellent | Good | Excellent | Good | Good | Good |
| Example 9 | Pigment dispersion 8 | Good | Excellent | Good | Excellent | Good | Good |
| Example 10 | Pigment dispersion 9 | Excellent | Excellent | Good | Good | Good | Good |
| Example 11 | Pigment dispersion 10 | Excellent | Good | Excellent | Good | Good | Good |
| Example 12 | Pigment dispersion 11 | Good | Excellent | Good | Good | Good | Good |
| Example 13 | Pigment dispersion 12 | Excellent | Good | Excellent | Good | Good | Good |
| Example 14 | Pigment dispersion 13 | Good | Excellent | Good | Excellent | Good | Good |
| Example 15 | Pigment dispersion 14 | Excellent | Excellent | Good | Good | Good | Good |
| Example 16 | Pigment dispersion 15 | Excellent | Excellent | Good | Excellent | Good | Good |
| Example 17 | Pigment dispersion 16 | Excellent | Excellent | Excellent | Good | Good | Good |
| Example 18 | Pigment dispersion 17 | Excellent | Good | Excellent | Good | Good | Good |
| Example 19 | Pigment dispersion 18 | Excellent | Excellent | Excellent | Excellent | Good | Good |
| Example 20 | Pigment dispersion 19 | Good | Good | Excellent | Excellent | Good | Good |
| Example 21 | Pigment dispersion 20 | Excellent | Good | Good | Excellent | Good | Good |
| Example 22 | Pigment dispersion 21 | Excellent | Excellent | Excellent | Excellent | Good | Good |
| Example 23 | Pigment dispersion 22 | Excellent | Good | Good | Good | Good | Good |
| Example 24 | Pigment dispersion 23 | Good | Excellent | Good | Good | Good | Good |
| Comparative Example 1 | Pigment dispersion 24 | Poor | Poor | Poor | Poor | Good | Good |
| Comparative Example 2 | Pigment dispersion 25 | Fair | Poor | Good | Poor | Good | Good |

TABLE 5-2-continued

| | Pigment Dispersion | Image Density | | Bleed-through | | Scratch resistance | |
|---|---|---|---|---|---|---|---|
| | | Plain Paper 1 | Plain Paper 2 | Plain Paper 1 | Plain Paper 2 | Plain Paper 1 | Plain Paper 2 |
| Comparative Example 3 | Pigment dispersion 26 | Poor | Poor | Poor | Fair | Good | Good |
| Comparative Example 4 | Pigment dispersion 27 | Poor | Poor | Poor | Fair | Good | Good |
| Comparative Example 5 | Pigment dispersion 28 | Poor | Poor | Poor | Fair | Good | Good |
| Comparative Example 6 | Pigment dispersion 29 | Poor | Poor | Poor | Fair | Good | Good |
| Comparative Example 7 | Pigment dispersion 30 | Poor | Fair | Poor | Fair | Good | Good |
| Comparative Example 8 | Pigment dispersion 31 | Poor | Good | Poor | Fair | Good | Good |

TABLE 6-1

| | Pigment Dispersion | | Ink | |
|---|---|---|---|---|
| | Viscosity | Preservability | Viscosity | Preservability |
| Comparative Example 9 (Ink of Example 1) | Excellent | Excellent | Excellent | Excellent |
| Comparative Example 10 (Ink of Comparative Example 1) | Good | Good | Good | Good |

TABLE 6-2

| | Image Density | | Bleed-through | | Scratch resistance | |
|---|---|---|---|---|---|---|
| | Filter paper | COPY PLUS | Filter paper | COPY PLUS | Filter paper | COPY PLUS |
| Comparative Example 9 (Ink of Example 1) | Poor | Excellent | Poor | Excellent | Good | Poor |
| Comparative Example 10 (Ink of Comparative Example 1) | Poor | Good | Poor | Good | Poor | Poor |

Having now fully described the invention, it will be apparent to one of ordinary skill in the art that many changes and modifications can be made thereto without departing from the spirit and scope of the invention as set forth therein.

What is claimed is:

1. An ink for inkjet recording, comprising:
a pigment;
a copolymer;
a water-soluble organic solvent; and
water,
wherein the copolymer is synthesized using at least the following monomers (1) and (2):
(1) unsaturated ethylene monomer having a phosphoric acid group or a phosphonic acid group; and
(2) unsaturated ethylene monomer having an alkyl group having 12 to 22 carbon atoms.

2. The ink for inkjet recording of claim 1, wherein the monomers (1) and (2) used in synthesizing the copolymer have a weight ratio [(1)/(2)] of from 0.1 to 10.

3. The ink for inkjet recording of claim 1, wherein the copolymer has a weight-average molecular weight of from 5,000 to 50,000.

4. The ink for inkjet recording of claim 1, wherein the water-soluble solvent comprises a water-soluble solvent having an equilibrium water content not less than 40% by weight in an environment of 23° C. and 80% Rh.

5. The ink for inkjet recording of claim 1, wherein the water-soluble solvent comprises a water-soluble solvent A having a boiling point greater than 250° C. and a water-soluble solvent B having a boiling point not less than 140° C. and less than 250° C.

6. The ink for inkjet recording of claim 5, wherein the water-soluble solvent A is a water-soluble solvent selected from the group consisting of 1,2,3-butanetriol, 1,2,4-butanetriol, glycerin, diglycerin, triethylene glycol and tetraethylene glycol; and the water-soluble solvent B is a water-soluble solvent selected from the group consisting of diethylene glycol and 1,3-butanediol.

7. The ink for inkjet recording of claim 5, wherein the water-soluble solvent A is glycerin and the water-soluble solvent B is 1,3-butanediol.

8. A set of a paper having a concentration of an eluted Ca ion of from 1.0×10-4 to 5.0×10-4 g/g when dipped in pure water and an ink for inkjet recording used for recording thereon, wherein the ink comprises:
a pigment;
a copolymer;
a water-soluble organic solvent; and
water, and
wherein the copolymer is synthesized using at least the following monomers (1) and (2):
(1) unsaturated ethylene monomer having a phosphoric acid group or a phosphonic acid group; and
(2) unsaturated ethylene monomer having an alkyl group having 12 to 22 carbon atoms.

9. The set of claim 8, wherein the monomers (1) and (2) used in synthesizing the copolymer have a weight ratio [(1)/(2)] of from 0.1 to 10.

10. The set of claim 8, wherein the copolymer has a weight-average molecular weight of from 5,000 to 50,000.

11. The set of claim 8, wherein the water-soluble solvent comprises a water soluble solvent having an equilibrium water content not less than 40% by weight in an environment of 23° C. and 80% Rh.

12. The set of claim 8, wherein the water-soluble solvent comprises a water soluble solvent A having a boiling point greater than 250° C. and a water-soluble solvent B having a boiling point not less than 140° C. and less than 250° C.

13. The set of claim 12, wherein the water-soluble solvent A is a water-soluble solvent selected from the group consisting of 1,2,3-butanetriol, 1,2,4-butanetriol, glycerin, diglycerin, triethylene glycol and tetraethylene glycol; and the water-soluble solvent B is a water-soluble solvent selected from the group consisting of diethylene glycol and 1,3-butanediol.

14. The set of claim 12, wherein the water-soluble solvent A is glycerin and the water-soluble solvent B is 1,3-butanediol.

\* \* \* \* \*